United States Patent
Chu et al.

(10) Patent No.: US 7,177,727 B2
(45) Date of Patent: Feb. 13, 2007

(54) METHOD FOR CALCULATING POWER FLOW SOLUTION OF A POWER TRANSMISSION NETWORK THAT INCLUDES UNIFIED POWER FLOW CONTROLLERS

(75) Inventors: Chia-Chi Chu, Tao-Yuan (TW); Sheng-Huei Lee, Tao-Yuan (TW); Hung-Chi Tsai, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 0 days.

(21) Appl. No.: 11/240,582

(22) Filed: Sep. 30, 2005

(65) Prior Publication Data

US 2006/0229767 A1  Oct. 12, 2006

(30) Foreign Application Priority Data

Apr. 8, 2005  (TW) ................................. 094111122

(51) Int. Cl.
 *H02J 3/04* (2006.01)
 *G08B 21/00* (2006.01)
(52) U.S. Cl. ...................... 700/287; 700/293; 700/297; 323/207
(58) Field of Classification Search .................. 700/28, 700/286, 287, 293, 297; 702/57, 60; 323/205, 323/207, 211
See application file for complete search history.

(56) References Cited

U.S. PATENT DOCUMENTS

| | | | | |
|---|---|---|---|---|
| 5,566,085 A | * | 10/1996 | Marceau et al. | 700/293 |
| 5,734,256 A | * | 3/1998 | Larsen et al. | 323/207 |
| 6,313,752 B1 | * | 11/2001 | Corrigan et al. | 340/657 |
| 6,625,520 B1 | * | 9/2003 | Chen et al. | 700/286 |
| 6,745,109 B2 | * | 6/2004 | Kojima et al. | 700/291 |
| 2004/0039490 A1 | * | 2/2004 | Kojima et al. | 700/287 |

* cited by examiner

*Primary Examiner*—Leo Picard
*Assistant Examiner*—Douglas S. Lee
(74) *Attorney, Agent, or Firm*—Darby & Darby

(57) ABSTRACT

A method for calculating power flow solution of a power transmission network with unified power flow controllers is adapted to calculate the power flow on a large-scale power transmission network. The unified power flow controller has a series transformer, a series converter, a direct current coupling capacitor, a shunt converter, and a series transformer. The shunt transformer is connected electrically to a sending-end bus. The series transformer is connected electrically to the sending-end bus and a receiving-end bus. The unified power flow controller is represented by equivalent active and reactive loads on the sending-end and receiving-end buses of the power transmission network.

17 Claims, 7 Drawing Sheets

METHOD FOR CALCULATING POWER FLOW SOLUTION OF A POWER TRANSMISSION NETWORK THAT INCLUDES UNIFIED POWER FLOW CONTROLLERS

CROSS-REFERENCE TO RELATED APPLICATION

This application claims priority of Taiwanese Application No. 094111122, filed on Apr. 8, 2005.

BACKGROUND OF THE INVENTION

1. Field of the Invention

The invention relates to a method for calculating power flow solution of a power transmission network, more particularly to a method for calculating power flow solution of a power transmission network that includes a single or multiple unified power flow controllers.

2. Description of the Related Art

Referring to FIG. 1, a power transmission network interface of a typical power system for two areas is shown to include a sending-end bus 811, a demand-end bus 812, a first transmission line 821, a second transmission line 822, a plurality of transmission lines 823, a plurality of power generator buses 814, a plurality of load buses 815, a plurality of power generating devices 83, and a plurality of load devices 84.

The transmission lines 821–823 in general have specific power transmission capacities for transmitting active power and reactive power. To ensure safe transmission of power, the power flow transmitted by these transmission lines must satisfy the following constraint of power transmission capacity:

$$\sqrt{(ActivePower)^2 + (ReactivePower)^2} \leq \text{transmission line capacity}$$

The first transmission line 821 and the second transmission line 822 are connected electrically to the sending-end bus 811 in area A and the demand-end bus 812 in area B.

The power generating devices 83 are, for instance, power generating plants or other equipment capable of supplying electric power. The load devices 84 are, for instance, residences, factories, etc., in cites or towns. The buses 811–815 are, for instance, substations capable of voltage transformation.

The power generating devices 83 transmit electric power to the load devices 84 through the transmission lines 821–823 and the buses 811–815. During the process of transmission, since the transmission lines 821–823 have inductive and capacitive impedances, the active and reactive powers outputted by the power generating devices 83 are partly lost on the transmission lines 821–823. The remaining active and reactive powers are delivered to the load devices 84 to meet the power demands of residences and factories.

To facilitate description herein, it is assumed that the total power generation is larger than the total load in area A, and that the total power generation is smaller than the total load in area B. Thus, surplus power in area A will be transmitted to area B through the first transmission line 821 and the second transmission line 822 which interconnect the two areas. When the cities or towns in area B grow bigger or there are more factories, the load devices 84 in area B will have a higher demand for power. Then, the power generating devices 83 in area A need to increase their power output, and the flow of active power and reactive power transmitted through the first transmission line 821 and the second transmission line 822 will in turn increase. If the power transmission capacities of the first transmission line 821 and the second transmission line 822 are different, the power flow will be distributed according to the impedance characteristics of the two transmission lines 821, 822, thereby resulting in unbalanced loading of the first and second transmission lines.

For example, supposing the first and second transmission lines 821, 822 have maximum power flow capacity constraints of 200 MVA and 400 MVA, respectively, if area A needs to transmit a total power of 370 MVA to area B, the power flows of the first and second transmission lines 821, 822 will be distributed according to the impedances of the first and second transmission lines 821, 822, which may cause the power flows of the first transmission line 821 and the second transmission line 822 to reach 180 MVA and 190 MVA, respectively. At this time, the power flow of the first transmission line 821 has approached its power flow capacity constraint of 200 MVA, whereas the power flow of the second transmission line 822 is still far below its power flow capacity constraint of 400 MVA. Such a situation of unbalanced loading of the first and second transmission lines 821, 822 will reduce the reliability of the power transmission network.

One way to improve the above situation is to replace the first transmission line 821 with one having a higher power transmission capacity so as to solve the problem of overload associated with the old first transmission line 821. However, such an approach is difficult to implement in practice since the first transmission line 821 may be as long as tens or hundreds of miles. Therefore, re-building the first transmission line 821 will be a huge project.

Referring to FIGS. 2 and 3, another conventional approach is to install a unified power flow controller (UPFC) 7 in the power transmission network and to use the UPFC 7 to regulate the power flow of the first transmission line 821 so as to reduce the loading of the first transmission line 821. It is noted that a receiving-end bus 813 will be added to the power transmission network after installing the UPFC 7 in the power transmission network.

The UPFC 7 is embedded between the sending-end and receiving-end buses 811, 813, and the first transmission line 821 is connected electrically to the receiving-end bus 813 and the demand-end bus 812. The UPFC 7 has the ability to regulate the active and reactive powers transmitted from the UPFC 7 to the receiving-end bus 813 such that the active and reactive power flows transmitted to the demand-end bus 812 through the first transmission line 821 is controllable. In addition, the UPFC 7 can also control the magnitude of voltage on the sending end bus 811 to enhance the voltage stability of the power transmission network.

The UPFC 7 includes a series transformer 71, a series converter 72, a direct current coupling capacitor 73, a shunt converter 74, and a shunt transformer 75, as best shown in FIG. 3.

The direct current coupling capacitor 73 stores a DC voltage with a voltage magnitude of $V_{dc}$, and is connected electrically to the series converter 72 and the shunt converter 74. The series converter 72 is connected electrically to the shunt converter 74 and the series transformer 71. The shunt converter 74 is connected electrically to the shunt transformer 75.

The shunt transformer 75 is connected electrically to the sending-end bus 811, and outputs an AC voltage $V_s$. The series transformer 71 is connected electrically to the sending-end and receiving-end buses 811, 813, and outputs a controllable AC voltage $V_2$ between the sending-end and receiving-end buses 811, 813.

The series transformer 71 controls the active and reactive power flows transmitted via the first transmission line 821 by injecting the AC voltage $V_2$. The shunt transformer 75 maintains the voltage on the sending-end bus 811 stably at a target value $V_s^{ref}$ by injecting the AC voltage $V_s$.

Each of the converters of the UPFC 7 can independently operate as an inverter or a rectifier. When the active power is transmitted from the AC side of the converter to the DC side, the converter is operated as a rectifier. When the active power is transmitted from the DC side of the converter to the AC side, the converter is operated as an inverter.

The shunt converter 74 can absorb or supply active power from or to the sending-end bus 811. The portion of the active power that is absorbed from the sending-end bus 811 is converted to direct current through the shunt transformer 75 and the shunt converter 74 so as to regulate the power stored in the direct current coupling capacitor 73 such that the voltage magnitude on the direct current coupling capacitor 73 can be maintained constant. At the same time, active power is concurrently supplied to the series converter 72.

The series converter 72 converts the power stored in the direct current coupling capacitor 73 to result in the AC voltage $V_2$ of the series transformer 71 that is injected between the sending-end bus 811 and the receiving-end bus 813, and controls the voltage magnitude $|V_2|$ and phase angle $\theta_2$ of the AC voltage, so as to regulate the active and reactive powers transmitted to the receiving-end bus 813. The transmission of active power between the converters may be in a direction from the shunt converter 74 to the series converter 72, or in a reverse direction.

It is noted that, since the first transmission line 821 is connected to the receiving-end bus 813, the active and reactive powers injected into the first transmission line 821 are the active and reactive powers delivered to the receiving-end bus 813 by the UPFC 7. Therefore, by controlling the power flow delivered to the receiving-end bus 813, the UPFC 7 enables the power flows on the first and second transmission lines 821, 822 to reach a balanced loading condition, and enhances the power reliability of the power transmission network.

In order to adjust the power flow injected into the receiving-end bus 813 to a predetermined control target value, referring to FIGS. 2 to 6, a conventional approach to calculate the power flow solution of a power transmission network that includes a unified power flow controller is disclosed in a paper entitled "Unified power flow controller: a critical comparison of Newton-Raphson UPFC algorithms in power flow studies" by C. R. Fuerte-Esquivel and E. Acha in IEE Proc. Generation, Transmission & Distribution, 1997, and in a paper entitled "A comprehensive Newton-Raphson UPFC model for the quadratic power flow solution of practical power network" by C. R. Fuerte-Esquivel, E. Acha and H. Ambriz-Perez in IEEE Trans. Power System, 2000.

Hereinafter, to facilitate description, the definitions of terms as used herein, such as power flow equation, mismatch vector, etc., are set forth as follows:

A power flow equation is used to describe the balance relationship between the active and reactive powers at each bus in a power transmission network. A power flow equation without considering the power flow controller is explained in detail in the book "Power System Analysis" by A. B. Bergen and V. Vittal, Prentice Hall, 2000.

Take a power transmission network having m buses as an example. A power flow equation without considering the power flow controller can be expressed as follows:

$$P_i-(P_{Gi}-P_{Li})=0 \quad i=1,2,\ldots m \qquad \text{equation (1-1)}$$

$$Q_i-(Q_{Gi}-Q_{Li})=0 \quad i=1,2,\ldots m \qquad \text{equation (1-2)}$$

where $P_{Gi}$ and $Q_{Gi}$ are respectively the active and reactive powers generated by a power generating device connected to a bus i; $P_{Li}$ and $Q_{Li}$ are respectively the active and reactive powers consumed by a load connected to the bus i; and $P_i$ and $Q_i$ are respectively the total active and reactive powers flowing from the bus i to the transmission lines. $P_i$ and $Q_i$ can be expressed as:

$$P_i = \sum_{k=1}^{n} |V_i||V_k|[G_{ik}\cos(\theta_i-\theta_k)+B_{ik}\sin(\theta_i-\theta_k)] \qquad \text{equation (1-3)}$$

$$Q_i = \sum_{k=1}^{n} |V_i||V_k|[G_{ik}\sin(\theta_i-\theta_k)+B_{ik}\cos(\theta_i-\theta_k)] \qquad \text{equation (1-4)}$$

where $G_{ik}+jB_{ik}$ is the admittance of the transmission lines, and can be obtained by calculating the reciprocal of the impedances of the transmission lines; n is the number of transmission lines connected to the bus i; $|V_i|$ and $|V_k|$ are voltage magnitudes at bus i and bus k; and $\theta_i$ and $\theta_k$ are phase angles at bus i and bus k.

The active power delivered to a bus must be equal to the active power delivered from the bus, and the reactive power delivered to a bus must be equal to the reactive power delivered from the bus. By grouping together the equations of the buses, a power flow equation of the power system can be obtained.

Elements of a mismatch vector include the amounts of imbalance of the active power and the reactive power on all the buses in the transmission network in each iteration. Each active power and each reactive power are functions of voltage magnitudes and phase angles at the buses, respectively. Therefore, the mismatch vector can be expressed as:

$$f(x^{(k)}) = \begin{bmatrix} P_i(x^{(k)})-(P_{Gi}-P_{Li}) \\ Q_i(x^{(k)})-(Q_{Gi}-Q_{Li}) \end{bmatrix} i=1,2,\ldots,m \qquad \text{equation (1-5)}$$

where $x^{(k)}$ is the kth iteration value of state vector x. The state vector x is composed of the voltage magnitudes and phase angles at the buses, and can be expressed as:

$$x = \begin{bmatrix} \theta_i \\ |V_i| \end{bmatrix} i=1,2,\ldots,m \qquad \text{equation (1-6)}$$

As shown in FIG. 4, the approach proposed by C. R. Fuerte-Esquivel et al. is to adopt a voltage source-based static model to represent the UPFC 7. The static model employs a series voltage source 61 and a series impedance 62 having an impedance value of $R_{ser}+jX_{ser}$ to model the series converter 72 and the series transformer 71. The series voltage source 61 outputs an AC voltage $V_{ser}$. The AC voltage $V_{ser}$ has a voltage magnitude $|V_{ser}|$ and a phase angle $\theta_{ser}$. The series impedance 62 represents the impedance of the series transformer 71.

The shunt converter 74 and the shunt transformer 75 are modeled by a shunt voltage source 63 with a voltage $V_{sh}$, and a shunt impedance 64 with an impedance value of $R_{sh}+jX_{sh}$. The voltage magnitude and phase angle of the shunt voltage source 63 are $|V_{sh}|$ and $\theta_{sh}$, respectively. Similarly, the shunt impedance 64 represents the impedance of the shunt transformer 75.

The static model relies on the voltage sources and impedances to result in an effect equivalent to that attributed to the UPFC 7 on the power flow between the sending-end and receiving-end buses 811, 813. The impedances $R_{ser}$, $R_{sh}$, $X_{ser}$ and $X_{sh}$ can be obtained from specifications provided by manufacturers of the transformers, whereas the output voltage magnitudes $|V_{sh}|$, $|V_{ser}|$ and phase angles $\theta_{sh}$, $\theta_{ser}$ of the voltage sources are control variables of the UPFC 7. The control variables can be controlled independently through pulse width modulation (PWM) in the converters. The voltage sources and impedances in the static model are used to estimate equivalent loads $P_r$, $Q_r$, $P_s$, and $Q_s$ caused by the UPFC 7 on the sending-end and receiving-end buses 811, 813.

Referring to FIGS. 2 to 6, the conventional approach uses the static model in conjunction with the Newton-Raphson algorithms to calculate solutions of $|V_{sh}|$, $\theta_{sh}$, $|V_{ser}|$, and $\theta_{ser}$. The calculating method includes the following steps:

In step 901, an initial vector value $x^{(k)}$ is given to the state vector x, the elements in the state vector x including control variables $|V_{sh}|$, $\theta_{sh}$, $|V_{ser}|$, and $\theta_{ser}$ relevant to the UPFC 7, and the voltage magnitude $|V_i|$ and phase angle $\theta_i$ at each bus in the power transmission network.

However, since a power transmission network generally includes a large number of buses, to facilitate description hereinafter, only the voltage magnitudes and phase angles at those buses that are connected to the UPFC 7 are provided when the state vector is described. In the following, it is assumed that the voltage magnitude and phase angle at the sending-end bus 811 are $|V_s|$ and $\theta_s$, respectively, and that the voltage magnitude and the phase angle at the receiving-end bus 813 are $|V_r|$ and $\theta_r$, respectively.

In this step, using the power transmission network illustrated in FIG. 2 as an example, the elements in the state vector x include the voltage magnitude $|V_s|$ and phase angle $\theta_s$ at the sending-end bus 811, and the voltage magnitude $|V_r|$ and phase angle $\theta_r$ at the receiving-end bus 813. Therefore, after executing step 901, the initial vector value $x^{(k)}$ of the state vector x includes $|V_s|^{(k)}$, $\theta_s^{(k)}$, $|V_r|^{(k)}$, $\theta_r^{(k)}$, $|V_{sh}|^{(k)}$, $\theta_{sh}^{(k)}$, $|V_{ser}|^{(k)}$, and $\theta_{ser}^{(k)}$.

In step 902, the state vector value $x^{(k)}$ is substituted into the mismatch vector f of the power transmission network shown in FIG. 6 to calculate the value $f(x^{(k)})$ of the mismatch vector f while neglecting the equivalent load of the UPFC 7 on the power transmission network.

It is noted that, in the power transmission network shown in FIG. 6, although the UPFC 7 of FIG. 2 is removed, it is still necessary to retain the receiving-end bus 813. The mismatch vector f is as shown in equation (1-5).

In step 903, the state vector $x^{(k)}$ is substituted into a Jacobian matrix J of the power transmission network of FIG. 6 to calculate the value $J(x^{(k)})$ of the Jacobian matrix J while neglecting the equivalent load of the UPFC 7 on the power transmission network.

The Jacobian matrix J is the first-order partial derivatives of the mismatch vector f with respect to the state vector x.

In step 904, equations (1-7) and (1-8) are used to calculate the equivalent load caused by the UPFC 7 on the receiving-end bus 813, i.e., the active and reactive powers $P_r$, $Q_r$ absorbed by the UPFC 7 from the receiving-end bus 813 are expressed in terms of $|V_s|$, $\theta_s$, $|V_r|$, $\theta_r$, $|V_{sh}|$, $\theta_{sh}$, $|V_{ser}|$, and $\theta_{ser}$ of the state vector x. The values of $|V_s|^{(k)}$, $\theta_s^{(k)}$, $|V_r|^{(k)}$, $\theta_r^{(k)}$, $|V_{sh}|^{(k)}$, $\theta_{sh}^{(k)}$, $|V_{ser}|^{(k)}$, and $\theta_{ser}^{(k)}$ are also substituted into $P_r$, $Q_r$ to obtain $P_r(x^{(k)})$, $Q_r(x^{(k)})$.

$$P_r = |V_r|^2 G_{rr} + \qquad \text{equation (1-7)}$$
$$|V_s||V_r|(G_{rs}\cos(\theta_r - \theta_s) + B_{rs}\sin(\theta_r - \theta_s)) +$$
$$|V_r||V_{ser}|(G_{rr}\cos(\theta_r - \theta_{ser}) + B_{rr}\sin(\theta_r - \theta_{ser}))$$

$$Q_r = -|V_r|^2 B_{rr} + \qquad \text{equation (1-8)}$$
$$|V_s||V_r|(G_{rs}\sin(\theta_r - \theta_s) - B_{rs}\cos(\theta_r - \theta_s)) +$$
$$|V_r||V_{ser}|(G_{rr}\sin(\theta_r - \theta_{ser}) - B_{rr}\cos(\theta_r - \theta_{ser}))$$

where $G_{rr}$, $B_{rr}$, $G_{rs}$, and $B_{rs}$ can be obtained from the following equations:

$$G_{rr} + jB_{rr} = \frac{1}{R_{ser} + jX_{ser}}$$

$$G_{rs} + jB_{rs} = -\frac{1}{R_{ser} + jX_{ser}}$$

In step 905, equations (1-9) and (1-10) are used to calculate the equivalent load caused by the UPFC 7 on the sending-end bus 811, i.e., the active and reactive powers $P_s$, $Q_s$ absorbed by the UPFC 7 from the sending-end bus 811 are expressed in terms of $|V_s|$, $\theta_s$, $|V_r|$, $\theta_r$, $|V_{sh}|$, $\theta_{sh}$, $|V_{ser}|$, and $\theta_{ser}$. The values of $|V_s|^{(k)}$, $\theta_s^{(k)}$, $|V_r|^{(k)}$, $\theta_r^{(k)}$, $|V_{sh}|^{(k)}$, $\theta_{sh}^{(k)}$, $|V_{ser}|^{(k)}$, and $\theta_{ser}^{(k)}$ are substituted into $P_s$, $Q_s$ to obtain the values of $P_s(x^{(k)})$, $Q_s(x^{(k)})$.

$$P_s = |V_s|^2 G_{ss} + |V_s||V_r|(G_{sr}\cos(\theta_s - \theta_r) + B_{sr}\sin(\theta_s - \theta_r)) + \quad \text{equation (1-9)}$$
$$|V_s||V_{ser}|(G_{sr}\cos(\theta_s - \theta_{ser}) + B_{sr}\sin(\theta_s - \theta_{ser})) +$$
$$|V_s||V_{sh}|(G_{sh}\cos(\theta_s - \theta_{sh}) + B_{sh}\sin(\theta_s - \theta_{sh}))$$

$$Q_s = -|V_s|^2 B_{ss} + |V_s||V_r| \qquad \text{equation (1-10)}$$
$$(G_{sr}\sin(\theta_s - \theta_r) + B_{sr}\cos(\theta_s - \theta_r)) +$$
$$|V_s||V_{ser}|(G_{sr}\sin(\theta_s - \theta_{ser}) - B_{sr}\cos(\theta_s - \theta_{ser})) +$$
$$|V_s||V_{sh}|(G_{sh}\sin(\theta_s - \theta_{sh}) - B_{sh}\cos(\theta_s - \theta_{sh}))$$

where $G_{ss}$, $B_{ss}$, $G_{sr}$, $B_{sr}$, $G_{sh}$ and $B_{sh}$ can be obtained from the following equations:

$$G_{ss} + jB_{ss} = -\frac{1}{R_{ser} + jX_{ser}} + \frac{1}{R_{sh} + jX_{sh}}$$

$$G_{sr} + jB_{sr} = -\frac{1}{R_{ser} + jX_{ser}}$$

$$G_{sh} + jB_{sh} = -\frac{1}{R_{sh} + jX_{sh}}$$

In step 906, the sum $$P_r + P_{line}^{ref}$$

of the equivalent active load $P_r$ of the UPFC 7 at the receiving-end bus 813 and the control target value $$P_{line}^{ref},$$

the sum $$Q_r + Q_{line}^{ref}$$

of the equivalent reactive load $Q_r$ of the UPFC 7 at the receiving-end bus 813 and the control target value $$Q_{line}^{ref},$$

and the difference $|V_s|-V_s^{ref}$ between the voltage $|V_s|$ at the sending-end bus 811 and the control target value $V_s^{ref}$ are calculated.

In step 907, the mismatch of an active power balance equation $P_{dc}$ is calculated based on equation (1-11):

$$P_{dc} = P_{ser} + P_{sh} \qquad \text{equation (1-11)}$$

where $P_{ser}$ is the active power that the series converter 72 injected into the AC side, and can be obtained based on equation (1-12):

$$P_{ser} = |V_{ser}|^2 G_{rr} + \qquad \text{equation (1-12)}$$
$$|V_{ser}||V_s|(G_{sr}\cos(\theta_{ser} - \theta_s) + B_{sr}\sin(\theta_{ser} - \theta_s)) +$$
$$|V_{ser}||V_r|(G_{rr}\cos(\theta_{ser} - \theta_r) + B_{rr}\sin(\theta_{ser} - \theta_r))$$

and $P_{sh}$ is the active power that the shunt converter 74 injected into the AC side, and can be obtained from equation (1-13):

$$P_{sh} = -|V_{sh}|G_{sh} + \qquad \text{equation (1-13)}$$
$$|V_{sh}||V_s|(G_{sh}\cos(\theta_{sh} - \theta_s) + B_{sh}\sin(\theta_{sh} - \theta_s))$$

In step 908, the value of the mismatch vector f' of the power transmission network that includes the UPFC 7 is modified based on equation (1-14):

$$f' = f + \Delta f_{UPFC} \qquad \text{equation (1-14)}$$

where f is the value of the mismatch vector while neglecting the UPFC 7, and was obtained in step 902; and $\Delta f_{UPFC}$ is the amount of adjustment added as a result of inclusion of the UPFC 7, and is calculated based on equation (1-15):

$$\Delta f_{UPFC} = \begin{bmatrix} P_s \\ Q_s \\ P_r \\ Q_r \\ P_r + P_r^{ref} \\ Q_r + Q_r^{ref} \\ V_s - V_s^{ref} \\ P_{dc} \end{bmatrix} \qquad \text{equation (1-15)}$$

In step 909, the value J' of the Jacobian matrix of the power transmission network that includes the UPFC 7 is modified based on equation (1-16):

$$J'(x^{(k)}) = J(x^{(k)}) + \partial \Delta f_{UPFC}/\partial x \qquad \text{equation (1-16)}$$

where $J(x^{(k)})$ is the value of the Jacobian matrix while neglecting the UPFC 7, and was obtained in step 903; and $\partial \Delta f_{UPFC}/\partial x$ is the amount of adjustment.

In step 910, $f'(x^{(k)})$ and $J'(x^{(k)})$ calculated in steps 908 and 909 are substituted into the following equation to calculate the updated state vector $x^{(k+1)}$:

$$x^{(k+1)} = x^{(k)} - J'^{-1}(x^{(k)})f'(x^{(k)}) \qquad \text{equation (1-17)}$$

In step 911, it is determined whether $f'(x^{(k)})$ is smaller than an tolerable error. If $f'(x^{(k)})$ is smaller than the tolerable error, this indicates that the state vector x has converged to the solution of the power flow equation. Conversely, $x^{(k+1)}$ is used as an updated $x^{(k)}$, and the flow skips back to step 902. Steps 902 to 911 are repeated until $f'(x^{(k)})$ is smaller than the tolerable error.

In step 912, after the state vector x has converged, the converters 72, 74 are set with $|V_{sh}|$, $\theta_{sh}$, $|V_{ser}|$, and $\theta_{ser}$ of the state vector x using, for example, PWM techniques. At this time, the power flow of the first transmission line 821 will achieve the predetermined control target values $$P_{line}^{ref}$$

and $$Q_{line}^{ref},$$

and the voltage magnitude at the sending-end bus 811 will also achieve the predetermined control target $V_s^{ref}$.

However, when the converters 72, 74 convert the power flow between alternating currents and direct currents, due to the conversion efficiency of the converters 72, 74, the active power of the direct current coupling capacitor 73 cannot be 100% converted into the buses 811, 813, and a part of the power will be lost in the converters 72, 74.

Although the conventional approach has considered the active power consumed by the transformers 71, 75 when calculating the active power balance equations in equations (1-12) and (1-13), it fails to consider the loss attributed to the converters 72, 74, so that although the solution $|V_{sh}|$, $\theta_{sh}$, $|V_{ser}|$, and $\theta_{ser}$ of the power flow equation is used to set the converters 72, 74, the power flow transmitted to the receiving-end bus 813 still cannot achieve the control target values $$P_{line}^{ref}$$

and $$Q_{line}^{ref}$$

precisely.

Furthermore, the aforesaid conventional approach can only be adapted for use when the shunt converter 74 and the series converter 72 are operated in specific operating modes. That is, the shunt converter 74 is operated in an automatic voltage control mode to control voltage magnitude of the sending-end bus 811 at a fixed value, whereas the series converter 72 is operated in an automatic flow control mode to simultaneously control the active power and the reactive power transmitted to the receiving-end bus 813.

In addition, discretion has to be exercised when setting an initial value for the state vector $x^{(k)}$ in step 901 of the aforesaid conventional approach. If an improper initial value is selected, the solution of the power flow equation will not converge or the iterative solution of the state variable will oscillate.

SUMMARY OF THE INVENTION

Therefore, an object of the present invention is to provide a method for calculating power flow solution of a power transmission network that includes unified power flow controllers, which considers the active power losses of transformers and converters in the unified power flow controller at the same time.

Another object of this invention is to provide a method for calculating power flow solution of a power transmission network that includes unified power flow controllers, which is suitable for application to unified power flow controllers having shunt converters and series converters that are operable in a plurality of operating modes.

A further object of this invention is to provide a method for calculating power flow solution of a power transmission network that includes unified power flow controllers, in which, instead of using the voltage magnitudes and the phase angles of the shunt converter and the series converter as the state variables as in the prior art, the orthogonal current components of a shunt voltage source in an equivalent static model are used as the state variables, such that the effect of the selection of the initial values of the state variables on the convergence characteristics of the solution to the power flow equation can be minimized.

According to the above-stated objects, a method for calculating power flow solution of a power transmission network that includes unified power flow controllers is proposed. The method is adapted for application to a power transmission network, which includes at least one power generating device, at least one load device, a plurality of buses, and a plurality of transmission lines.

The unified power flow controller has a series transformer, a series converter, a direct current coupling capacitor, a shunt converter, and a shunt transformer, and is embedded between two buses of the power transmission network. The shunt transformer is connected electrically to a sending-end bus, and has an impedance $R_{sh}+jX_{sh}$. The series transformer is connected electrically to the sending-end bus and the receiving-end bus, and has an impedance $R_{ser}+jX_{ser}$.

The direct current coupling capacitor is connected electrically to the series converter and the shunt converter. The series converter is connected electrically to the shunt converter and the series transformer. The shunt converter is connected electrically to the shunt transformer. The voltage magnitude and the phase angle at the sending-end bus are $|V_s|$ and $\theta_s$, respectively, and the voltage magnitude and the phase angle at the receiving-end bus are $|V_r|$ and $\theta_r$, respectively.

For the unified power flow controller, a static model can be used to derive the equivalent loads of the unified power flow controller on the power transmission network. The static model includes a series voltage source, a series impedance, a shunt voltage source, and a shunt impedance. The series voltage source has one end connected electrically to the receiving-end bus. The series impedance is connected electrically to the other end of the series voltage source and the sending-end bus. The shunt impedance is connected electrically to the sending-end bus and the shunt voltage source.

The output voltages of the series voltage source and the shunt voltage source are $V_{ser}$ and $V_{sh}$, respectively. The output current $I_{ser}$ of the series voltage source can be represented by a direct-axis component $I_{ser}^D$ and a quadrature-axis component $I_{ser}^Q$. The output current $I_{sh}$ of the shunt voltage source can be represented by a direct-axis component $I_{sh}^D$ and a quadrature-axis component $I_{sh}^Q$.

The equivalent active and reactive loads on the sending-end bus resulting from the unified power flow controller are $P_s'$ and $Q_s'$, respectively, and the equivalent active and reactive loads on the receiving-end bus resulting from the unified power flow controller are $P_r'$ and $Q_r'$, respectively. The method for calculating power flow solution of a power transmission network that includes unified power flow controllers according to this invention comprises the following steps:

(A) Give an initial vector value $x^{(k)}$ to a state vector x:

a control objective of the shunt converter operated in an automatic reactive power control mode is to maintain reactive power injected into the sending-end bus at a fixed value $Q_{sh}^{ref}$, the state vector includes the voltage magnitudes $|V_s|$ and $|V_r|$ and the phase angles $\theta_s$ and $\theta_r$ at the sending-end and the receiving-end buses, and the direct-axis current component $I_{sh}^D$ of the shunt converter;

the control objective of the shunt converter operated in an automatic voltage control mode is to set the voltage magnitude $|V_s|$ at the sending-end bus to a fixed value $|V_s^{ref}|$, the state vector includes the voltage magnitude $|V_r|$ of the receiving-end bus, the phase angles $\theta_s$, $\theta_r$, at the sending-end and the receiving-end buses, and the direct-axis current component $I_{sh}^D$ and the quadrature-axis current component $I_{sh}^Q$ the shunt converter;

(B) Perform an orthogonal decomposition of a voltage $V_r$ at the receiving-end bus according to the following equation such that the voltage $V_r$ has a direct-axis component $V_r^D$ and a quadrature-axis component $V_r^Q$:

$$V_r^D + jV_r^Q = |V_r|e^{j(\theta_r - \theta_s)}$$

where the phase angle $\theta_s$ of the voltage $V_s$ at the sending-end bus is used as a reference angle;

(C) According to value of the state vector x, calculate the value of a mismatch vector f of the power transmission network while neglecting the unified power flow controller:

the mismatch vector f(x) of the power transmission network excluding the unified power flow controller is represented by the following equation:

$$f(x) = \begin{bmatrix} P_i(x) - (P_{Gi} - P_{Li}) \\ Q_i(x) - (Q_{Gi} - Q_{Li}) \end{bmatrix}$$

$$i = 1, 2, \ldots, m$$

where x is the state vector; m is the number of the buses in the power transmission network; $P_{Li}$ and $Q_{Li}$ are the active power and the reactive power consumed by the load device connected to the bus i, respectively; $P_{Gi}$ and $Q_{Gi}$ are the active power and the reactive power generated by the power generating device connected to the bus i, respectively; and $P_i$ and $Q_i$ are total active power and total reactive power flowing to the transmission lines from the bus i, respectively, and are represented by the following equations:

$$P_i = \sum_{k=1}^{n} |V_i||V_k|[G_{ik}\cos(\theta_i - \theta_k) + B_{ik}\sin(\theta_i - \theta_k)]$$

$$Q_i = \sum_{k=1}^{n} |V_i||V_k|[G_{ik}\sin(\theta_i - \theta_k) - B_{ik}\cos(\theta_i - \theta_k)]$$

where $G_{ik}+jB_{ik}$ are admittances of the transmission lines, and are calculated from the reciprocal of impedances of the transmission lines; n is the number of the transmission lines that are connected to the bus i; $|V_i|$ and $|V_k|$ are respectively voltage magnitudes at the bus i and bus k; and $\theta_i$ and $\theta_k$ are respectively phase angles at the bus i and the bus k;

(D) According to the value of the state vector x, calculate the value of the Jacobian matrix of the power transmission network while neglecting the unified power flow controller;

(E) According to the value of the state vector x, calculate the value of the active load $P_r'(x^{(k)})$ and the value of the reactive load $Q_r'(x^{(k)})$ of the unified power flow controller on the receiving-end bus:

a control objective of the series converter when operated in an automatic power flow control mode is to set the equivalent active load and the equivalent reactive load injected into the receiving-end bus to $$-P_{line}^{ref}$$

and $$-Q_{line}^{ref},$$

respectively, the active load $P_r'$ and reactive load $Q_r'$ of the receiving-end bus are represented by the following equations:

$$\begin{bmatrix} P_r' \\ Q_r' \end{bmatrix} = -\begin{bmatrix} P_{line}^{ref} \\ Q_{line}^{ref} \end{bmatrix}$$

the active load $P_r'$ and the reactive load $Q_r'$ of the receiving-end bus when the series converter is operated in a phase control mode are represented by the following equation:

$$\begin{bmatrix} P_r' \\ Q_r' \end{bmatrix} = \begin{bmatrix} -P_{line}^{ref} \\ (aP_{line}^{ref} + |V_s| - V_r^D)/b \end{bmatrix}$$

where a and b are respectively:

$$a = -\frac{R_{ser}V_r^D - X_{ser}V_r^Q}{|V_r|^2}, \quad b = -\frac{R_{ser}V_r^Q + X_{ser}V_r^D}{|V_r|^2};$$

the active load $P_r'$ and the reactive load $Q_r'$ of the receiving-end bus when the series converter is operated in a voltage regulation control mode are represented by the following equation:

$$\begin{bmatrix} P_r' \\ Q_r' \end{bmatrix} = \begin{bmatrix} -(aQ_{line}^{ref} - V_r^Q)/b \\ -Q_{line}^{ref} \end{bmatrix}$$

where a and b are respectively:

$$a = -\frac{R_{ser}V_r^D - X_{ser}V_r^Q}{|V_r|^2}, \quad b = -\frac{R_{ser}V_r^Q + X_{ser}V_r^D}{|V_r|^2}$$

a control objective of the series converter when operated in a direct voltage injection control mode is to set the direct-axis and quadrature-axis components $V_{ser,ref}^D$ and $V_{ser,ref}^Q$ of the voltage $V_{ser}$ of the series voltage source, respectively; the active load $P_r'$ and the reactive load $Q_r'$ of the unified power flow controller on the receiving-end bus are represented by the following equation:

$$\begin{bmatrix} P_r' \\ Q_r' \end{bmatrix} = \frac{V^2}{R_{ser}^2 + X_{ser}^2} \begin{bmatrix} a|V_s| + aV_{ser,ref}^D + bV_{ser,ref}^Q + R_{ser} \\ b|V_s| + bV_{ser,ref}^D - aV_{ser,ref}^Q + X_{ser} \end{bmatrix}$$

where a and b are respectively:

$$a = -\frac{R_{ser}V_r^D - X_{ser}V_r^Q}{|V_r|^2}, \quad b = -\frac{R_{ser}V_r^Q + X_{ser}V_r^D}{|V_r|^2}$$

(F) According to the values of $P_r'(x^{(k)})$ and $Q_r'(x^{(k)})$ calculated in step (E), calculate the current values $I_{ser}^D(x^{(k)})$ and $I_{ser}^Q(x^{(k)})$ of the series voltage source in the equivalent model:

the values of $P_r'$ and $Q_r'$ calculated in step (E) are substituted into the following equation to calculate the values of the direct-axis component $I_{ser}^D$ and the quadrature-axis component $I_{ser}^Q$ of the output current $I_{ser}$ of the series voltage source:

$$\begin{bmatrix} I_{ser}^D \\ I_{ser}^Q \end{bmatrix} = -\frac{1}{|V_r|^2} \begin{bmatrix} V_r^D & V_r^Q \\ V_r^Q & -V_r^D \end{bmatrix} \begin{bmatrix} P_r' \\ Q_r' \end{bmatrix}$$

(G) Calculate values of an active load $P_s'(x^{(k)})$ and a reactive load $Q_s'(x^{(k)})$ of the unified power flow controller on the sending-end bus:

the equivalent active load $P_s'$ and the equivalent reactive load $Q_s'$ of the unified power flow controller on the sending-end bus are expressed as a function of the direct-axis and quadrature-axis components $I_{ser}^D$ and $I_{ser}^Q$ of the output current of the series voltage source, and the state vector x and the $I_{ser}^D$ and $I_{ser}^Q$ obtained in step (F) are substituted into the following equation to obtain $P_s'$ and $Q_s'$:

$$\begin{bmatrix} P_s' \\ Q_s' \end{bmatrix} = \begin{bmatrix} V_s & 0 \\ 0 & -V_s \end{bmatrix} \begin{bmatrix} I_{ser}^D \\ I_{ser}^Q \end{bmatrix} + \begin{bmatrix} -V_s & 0 \\ 0 & V_s \end{bmatrix} \begin{bmatrix} I_{sh}^D \\ I_{sh}^Q \end{bmatrix}$$

where $I_{sh}^Q$ is calculated using the following equation when the shunt converter is operated in the automatic reactive power control mode:

$$I_{sh}^Q = -\frac{Q_{sh}^{ref}}{|V_s|}$$

where $Q_{sh}^{ref}$ is the reactive power set to be injected into the sending-end bus;

(H) According to active power losses of the transformers and the converters in the unified power flow controller, calculate the mismatch of an active power balance equation $P_{dc}'$:

the mismatch of the active power balance equation $P_{dc}'$ can be calculated from the following equation:

$$P_{dc}' = k_{ser} P_{ser}' + k_{sh} P_{sh}'$$

where $k_{ser}$ and $k_{sh}$ are conversion ratios of AC side active power to DC side active power of the series converter and the shunt converter, respectively, $P_{ser}'$ is the active power which the series converter injected into the series transformer, and $P_{sh}'$ is the active power which the shunt converter injected into the shunt transformer, $P_{ser}'$ and $P_{sh}'$ are represented by the following equations:

$$P_{ser}' = I_{ser}^D(V_r^D - |V_s|) + I_{ser}^Q V_r^Q + (I_{ser}^{D2} + I_{ser}^{Q2})R_{ser}$$

$$P_{sh}' = I_{sh}^D|V_s| + (I_{sh}^{D2} + I_{sh}^{Q2})R_{sh}$$

(I) Calculate the value $f'(x^{(k)})$ of the mismatch vector of the power transmission network that includes the unified power flow controller:

the mismatch vector f' of the power transmission network that includes the unified power flow controller is calculated from the following equation:

$$f' = f + \Delta f_{UPFC}$$

where the mismatch vector f of the power transmission network without the unified power flow controller has been obtained in step (C), and $\Delta f_{UPFC}$ is an amount of adjustment calculated from the following equation:

$$\Delta f_{UPFC} = \begin{bmatrix} P_s' \\ Q_s' \\ P_r' \\ Q_r' \\ P_{dc}' \end{bmatrix}$$

where $P_r'$, $Q_r'$ are respectively the active load and reactive load of the unified power flow controller on the receiving-end bus and have been obtained in step (E); $P_s'$, $Q_s'$ are respectively the equivalent active load and reactive load of the unified power flow controller on the sending-end bus and have been obtained in step (G); and $P_{dc}'$ is the mismatch of the active power balance equation and has been obtained in step (H);

(J) Calculate the value $J'(x^{(k)})$ of a Jacobian matrix of the power transmission network that includes the unified power flow controller:

the Jacobian matrix J' of the power transmission network that includes the unified power flow controller is obtained from the following equation:

$$J' = J + \Delta J = J + (\partial \Delta f_{UPFC}/\partial x)$$

where J is the Jacobian matrix of the power transmission network without the unified power flow controller, and has been obtained in step (D), and J' has one additional column $\partial P_{dc}/\partial x$ and one additional row $\partial \Delta f_{UPFC}/\partial I_{sh}^D$ more than J;

(K) Update the state vector $x^{(k+1)}$:

the updated state vector $x^{(k+1)}$ is calculated from the following equation:

$$x^{(k+1)} = x^{(k)} - J'^{-1}(x^{(k)}) f'(x^{(k)})$$

where $x^{(k)}$ is the initial value of the state vector set in step (B); $J'(x^{(k)})$ is the value of the Jacobian matrix of the power transmission network that includes the unified power flow controller, and has been obtained in step (J); and $f'(x^{(k)})$ is the value of the mismatch vector of the power transmission network that includes the unified power flow controller, and has been obtained in step (I);

(L) Determine whether $f'(x^{(k)})$ is smaller than a tolerable error and the flow proceeds to step (M) if $f'(x^{(k)})$ is smaller than the tolerable error, and otherwise use $x^{(k+1)}$ to update the state vector x, and the flow skips back to step (B) to repeat steps (B) to (L);

(M) According to the convergence value of the state vector x, calculate the voltages $V_{ser}$, $V_{sh}$ of the series voltage source and the shunt voltage source:

the voltages $V_{ser}$, $V_{sh}$ of the series voltage source and the shunt voltage source are calculated respectively using the following equations:

$$V_{ser} = |V_{ser}| \angle \theta_{ser} = \sqrt{V_{ser}^{D2} + V_{ser}^{Q2}} \angle \left( \tan^{-1} \frac{V_{ser}^Q}{V_{ser}^D} + \theta_s \right)$$

$$V_{sh} = |V_{sh}| \angle \theta_{sh} = \sqrt{V_{sh}^{D2} + V_{sh}^{Q2}} \angle \left( \tan^{-1} \frac{V_{sh}^Q}{V_{sh}^D} + \theta_s \right)$$

where the direct-axis and quadrature-axis components $V_{ser}^D$, $V_{ser}^Q$ of the voltage of the series voltage source, and the direct-axis and quadrature-axis components $V_{sh}^D$, $V_{sh}^Q$ of the voltage of the shunt voltage source are calculated using the following equations:

$$\begin{bmatrix} V_{ser}^D \\ V_{ser}^Q \end{bmatrix} = \begin{bmatrix} R_{ser} & -X_{ser} \\ X_{ser} & R_{ser} \end{bmatrix} \begin{bmatrix} I_{ser}^D \\ I_{ser}^Q \end{bmatrix} + \begin{bmatrix} V_r^D - |V_s| \\ V_r^Q \end{bmatrix}$$

$$\begin{bmatrix} V_{sh}^D \\ V_{sh}^Q \end{bmatrix} = \begin{bmatrix} R_{sh} & -X_{sh} \\ X_{sh} & R_{sh} \end{bmatrix} \begin{bmatrix} I_{sh}^D \\ I_{sh}^Q \end{bmatrix} + \begin{bmatrix} |V_s| \\ 0 \end{bmatrix};$$

(N) Set the converters of the unified power flow controller according to the voltages $V_{ser}$, $V_{sh}$ obtained in step (M).

The effects of this invention reside in that consideration is given to the active power losses of the transformers and converters in the unified power flow controller at the same time, and that the series converter and the shunt converter are set according to the calculated voltages of the series voltage source and the shunt voltage source as parameters. Therefore, this invention can achieve control objective values with higher precision than the prior art. In addition, because the direct-axis and quadrature-axis components of the output current of the shunt voltage source in the equivalent static model are used as the state variables in place of the voltage magnitudes and phase angles of the shunt converter and series converter in the prior art, not only can the number of state variables be decreased, the effect of the selection of the initial values of the state variables on the convergence characteristics of the solution to the power flow equation can be reduced as well. In addition, the method for calculating power flow solution of a power transmission network that includes unified power flow controllers is suited for application to a unified power flow controller which is operable in different operating modes, while ensuring good convergence characteristics under different control objectives.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
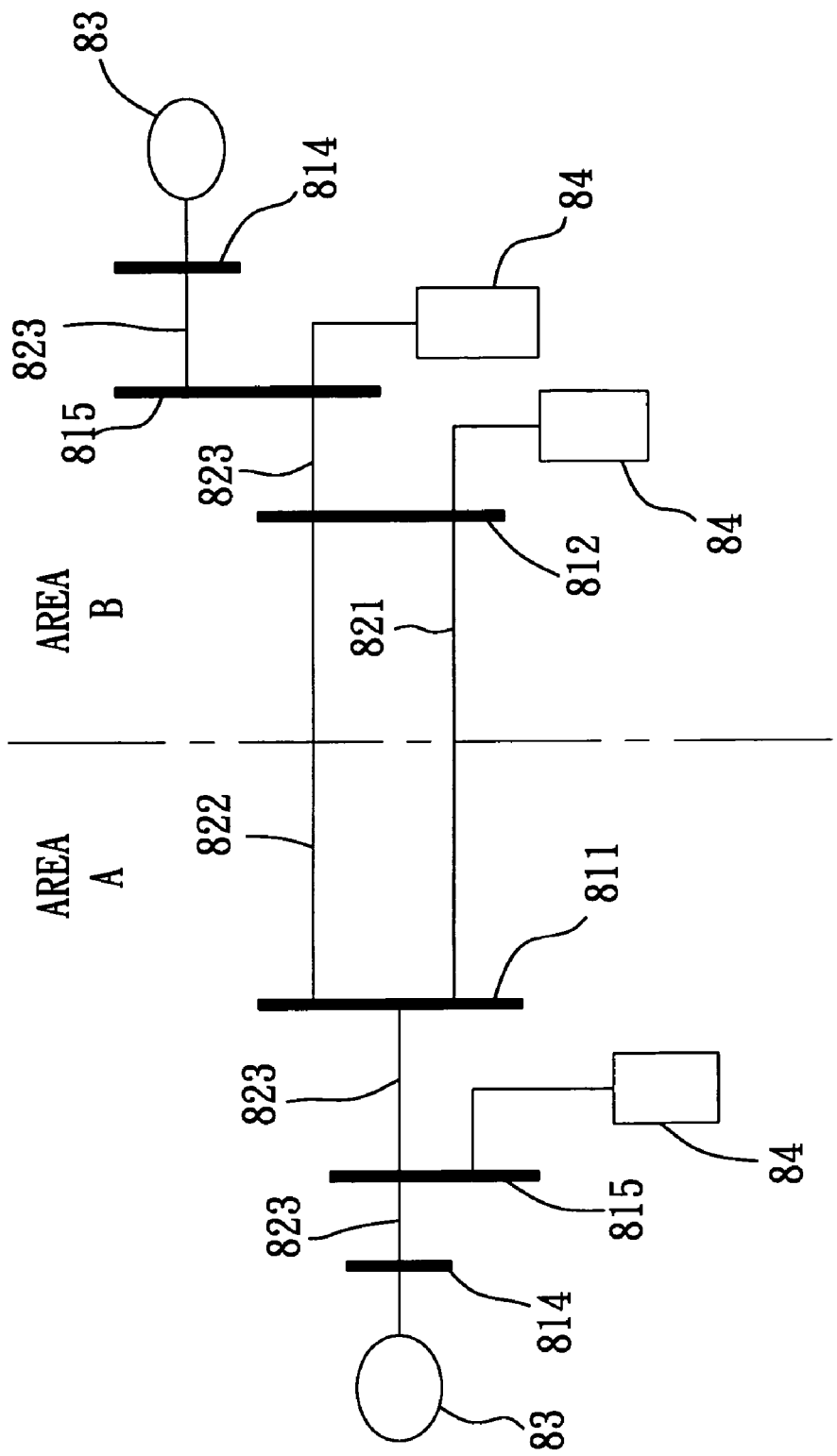
FIG. 1 is a diagram of a power transmission network that does not include a unified power flow controller.
Figure 2:
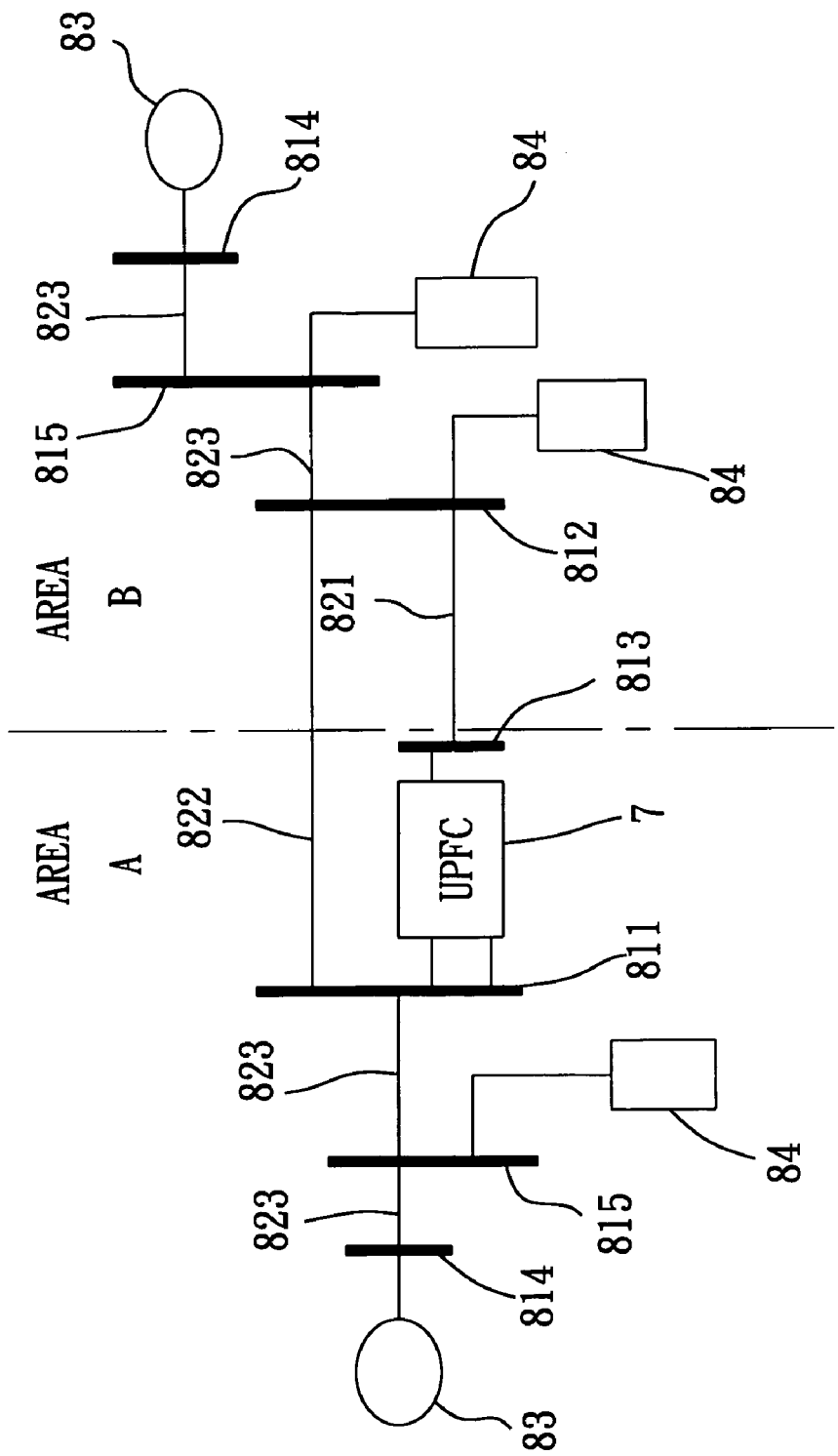
FIG. 2 is a power transmission network diagram similar to FIG. 1, showing that the power transmission network includes a unified power flow controller and a receiving-end bus.
Figure 7:
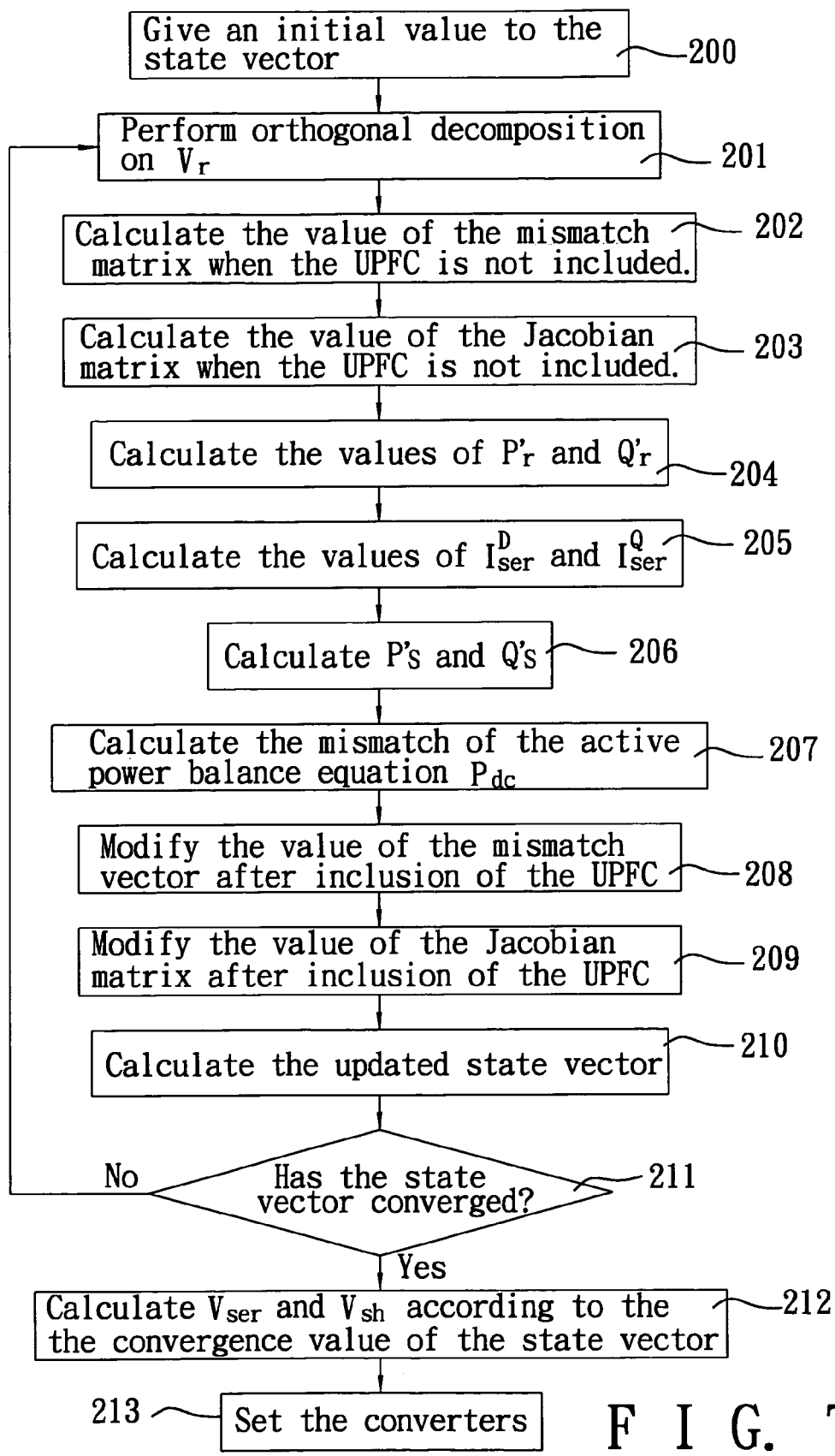
FIG. 7 is a flowchart of the preferred embodiment of a method for calculating power flow solution of a power transmission network that includes unified power flow controllers according to this invention.

Referring to FIGS. 2 and 7, the power flow calculating method of this invention is adapted for application to a power transmission network that includes unified power flow controllers. The power transmission network includes a sending-end bus 811, a receiving-end bus 813, a demand-end bus 812, a first transmission line 821, a second transmission line 822, a plurality of transmission lines 823, a plurality of power generating devices 83, and a plurality of load devices 84. In addition, the power transmission network has a UPFC 7 installed therein. Since the components of the power transmission network and the connections among the components are identical to those of the prior art, a description thereof is dispensed hereinafter for the sake of brevity.

Figure 3:
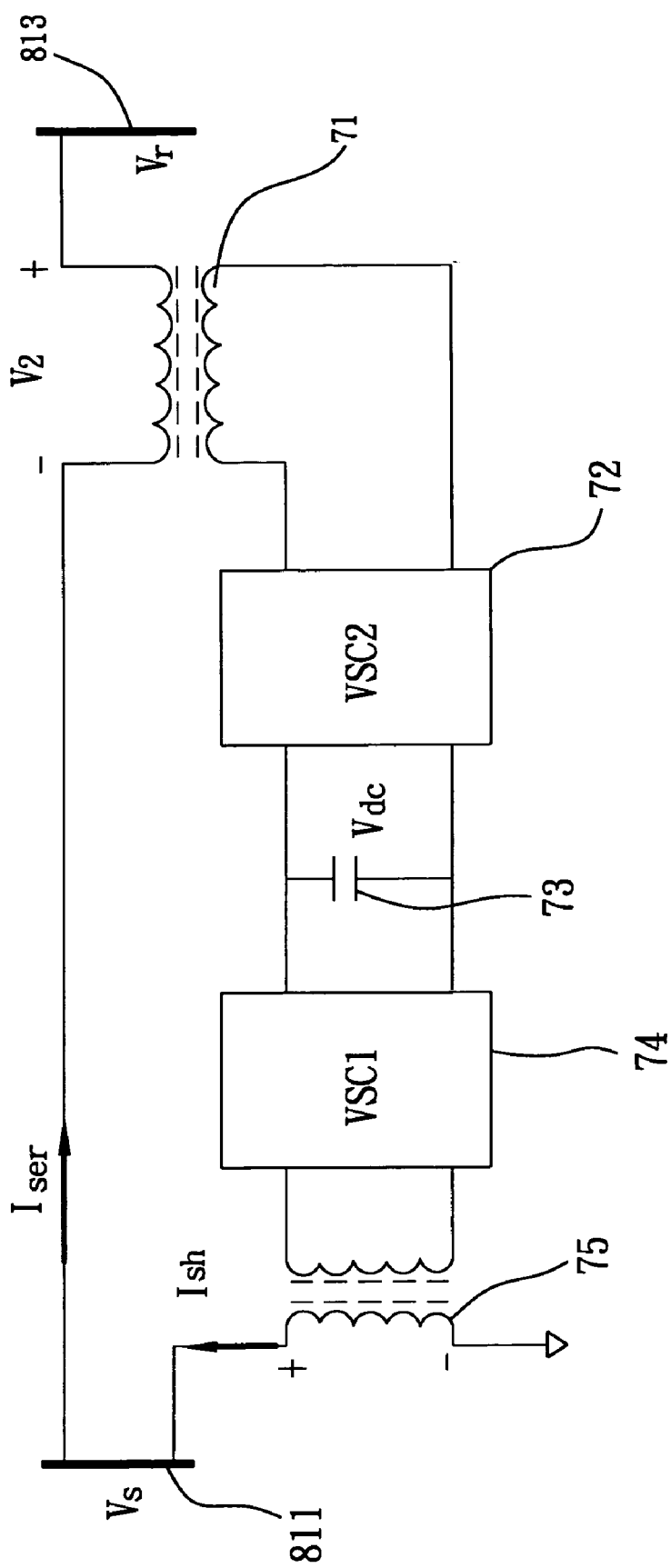
FIG. 3 is a system block diagram of the unified power flow controller, showing the connection of the unified power flow controller to the sending-end bus and the receiving-end bus.

Referring to FIG. 3, the UPFC 7 includes a series transformer 71, a series converter 72, a direct current coupling capacitor 73, a shunt converter 74, and a shunt transformer 75. Since the internal elements of the UPFC 7 and the circuit connections thereof are the same as those of the prior art, they will not be described in detail herein for the sake of brevity.

Figure 4:
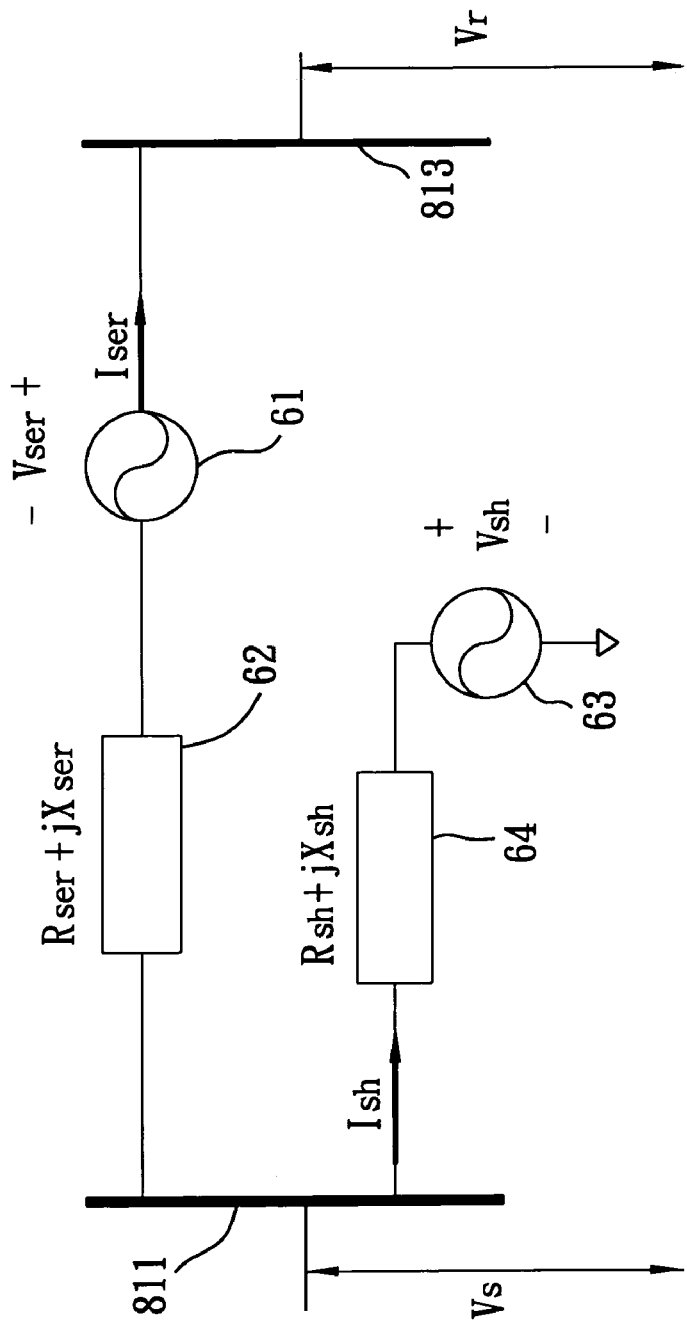
FIG. 4 illustrates a voltage source-based static model of the unified power flow controller.
Figure 5:
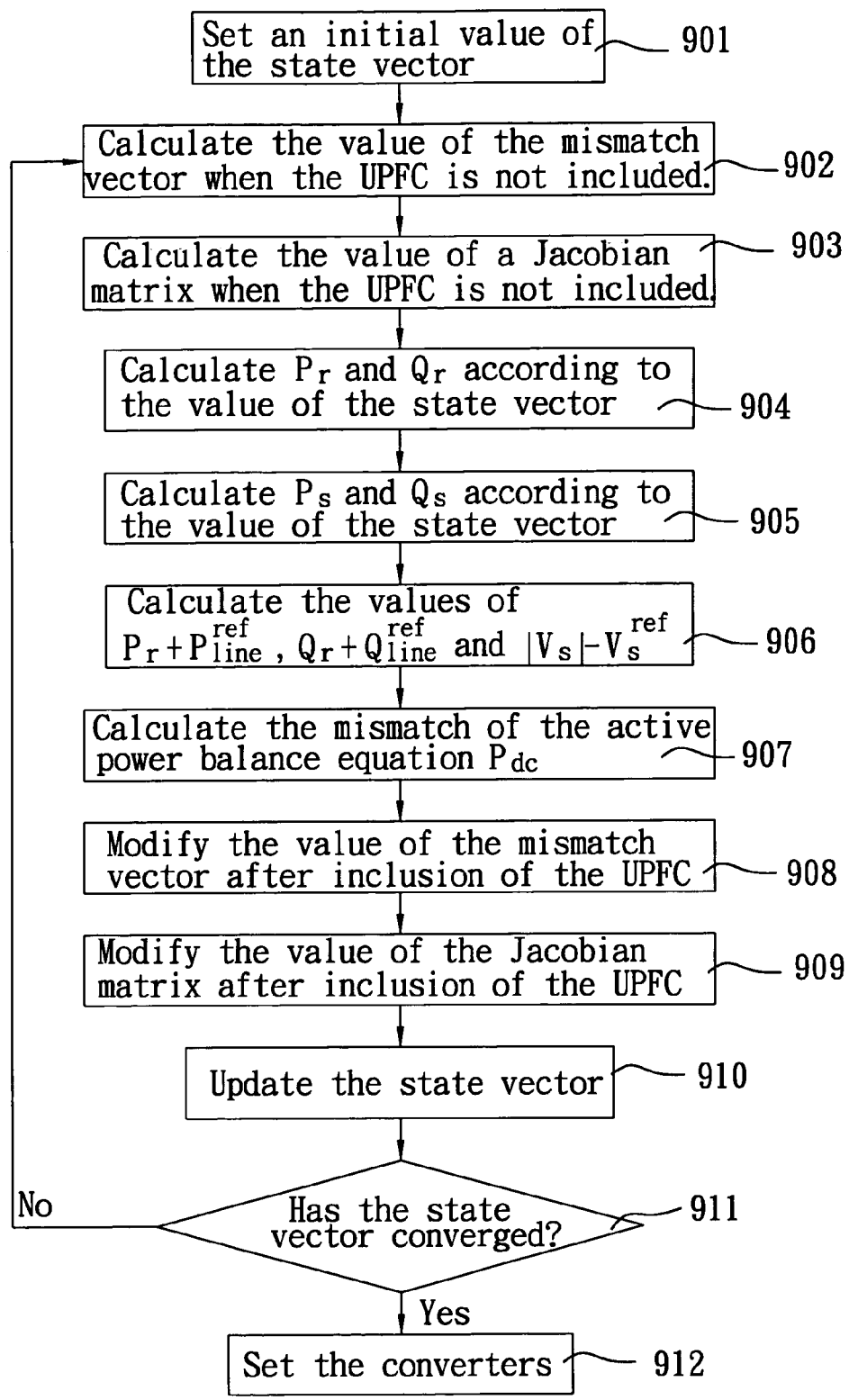
FIG. 5 is a flowchart of a conventional method for calculating power flow solution of a power transmission network that includes a unified power flow controller.

Referring to FIG. 4, when the method of this invention is used to analyze the power transmission network, the UPFC 7 is first represented by a static model. The static model is used to derive the equivalent loads attributed to the UPFC 7 on the power transmission network.

The static model used to represent the UPFC 7 includes a series voltage source 61, a series impedance 62, a shunt voltage source 63, and a shunt impedance 64. The circuit architecture of the static model is identical to that proposed in the prior art, and is therefore not described in detail hereinafter for the sake of brevity.

In this embodiment, the shunt converter 74 of the UPFC 7 is operated in an automatic reactive power control mode, and the control objective of the shunt converter 74 in this operating mode is to control the reactive power injected into the sending-end bus 811 at a fixed value $Q_{sh}^{ref}$. The corresponding equivalent reactive load to the sending-end bus 811 is $-Q_{sh}^{ref}$.

Referring to FIG. 7, the method for calculating the power flow solution of a power transmission network that includes unified power flow controllers according to this invention comprises the following steps:

In step 200, an initial vector value $x^{(k)}$ is given to a state vector x, and the elements in the state vector x include a direct-axis component $I_{sh}^D$ of the output current of the shunt voltage source 63, and the voltage magnitude and phase angle at each bus in the power transmission network.

However, a power transmission network generally includes a large number of buses. Therefore, for ease of description, in this embodiment, only the voltage magnitudes and phase angles at those buses that are associated with the UPFC 7 will be listed when the state vector x is described.

In this step, the power transmission network shown in FIG. 2 is taken as an example. The elements in the state vector include the voltage magnitude $|V_s|$ and phase angle $\theta_s$ at the sending-end bus 811, and the voltage magnitude $|V_r|$ and phase angle $\theta_r$ at the receiving-end bus 813. Therefore, after step 200 is executed, the initial vector value $x^{(k)}$ of the state vector x thus includes $|V_s^{(k)}|$, $\theta_s^{(k)}$, $|V_r^{(k)}|$, $\theta_r^{(k)}$, and $I_{sh}^{D(k)}$.

In step 201, orthogonal decomposition of a voltage $V_r$ at the receiving-end bus 813 is carried out based on equation (2-1) such that the voltage has a direct-axis component $V_r^D$ and a quadrature-axis component $V_r^Q$. In this embodiment, the phase angle $\theta_s$ of the voltage $V_s$ of the sending-end bus 811 is used as a reference angle. Therefore, $V_s$ only has a direct-axis component $|V_s|$ after the orthogonal decomposition.

$$V_r = V_r^D + jV_r^Q = |V_r|e^{j(\theta_r - \theta_s)} \quad \text{equation (2-1)}$$

Figure 6:
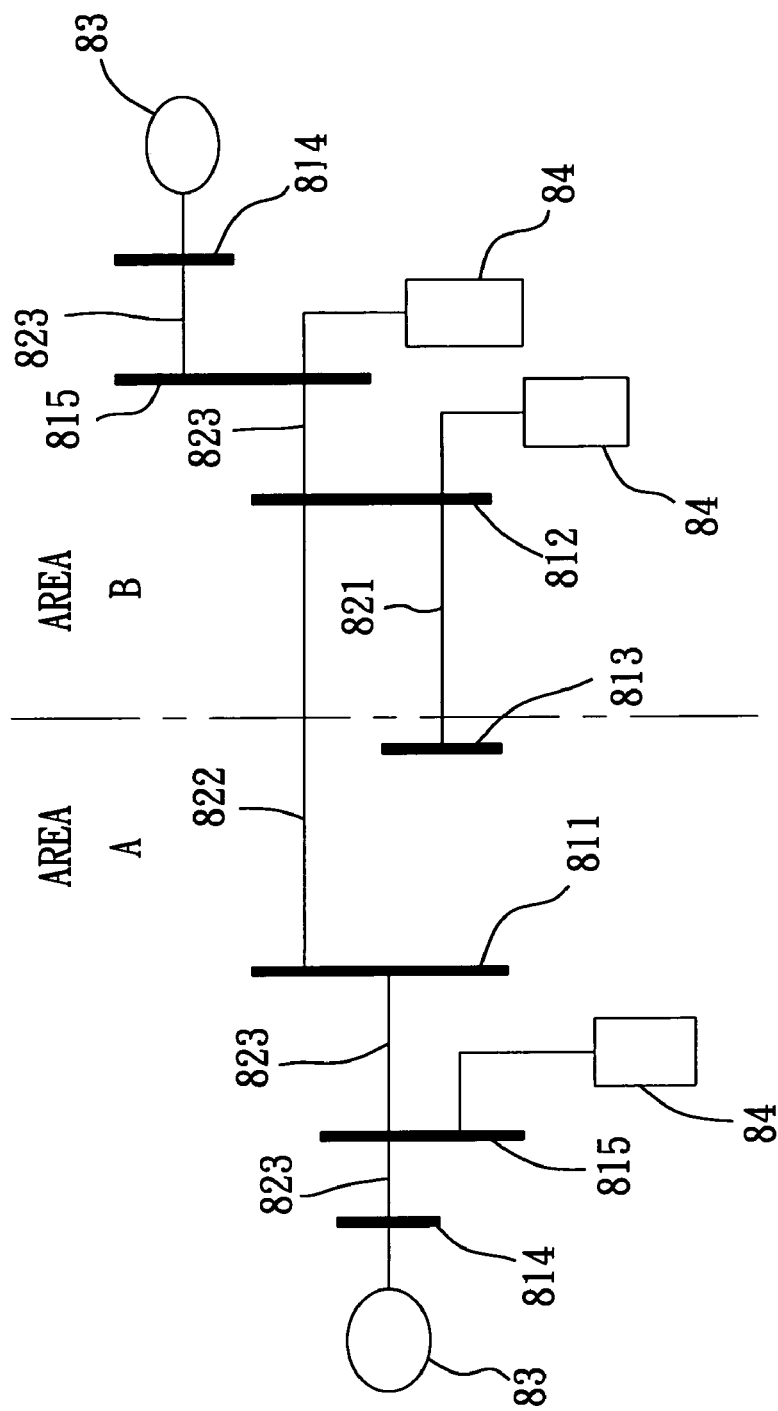
FIG. 6 is a power transmission network diagram similar to FIG. 2, but neglecting equivalent loads of the unified power flow controller.

In step 202, the state vector $x^{(k)}$ is used to calculate a mismatch vector f of the power transmission network in FIG. 6 to result in $f(x^{(k)})$ that neglects the equivalent loads of the UPFC 7 on the power transmission network. Calculation of the mismatch vector f is identical to that in equation (1-5) of the aforementioned prior art.

In step 203, while neglecting the equivalent loads of the UPFC 7 on the power transmission network, the state vector $x^{(k)}$ is substituted into the Jacobian matrix J of the power transmission network to calculate $J(x^{(k)})$. The technique of calculating the Jacobian matrix J is the same as that of the prior art described hereinabove.

In step 204, the relationship of the UPFC 7 to the active load $P_r'$ and the reactive load $Q_r'$ of the receiving-end bus 813, and the voltage $V_{ser}$ of the series voltage source 61 is calculated based on equations (2-2) and (2-3), and the active and reactive loads $P_r'$, $Q_r'$ of the UPFC 7 on the receiving-end bus 813 are set according to four different control modes, which will be described herein below. Besides, the state vector $x^{(k)}$ is substituted into $P_r'$-$Q_r'$ to calculate $P_r'(x^{(k)})$ -$Q_r'(x^{(k)})$.

$$\begin{bmatrix} V_{ser}^D \\ V_{ser}^Q \end{bmatrix} = \begin{bmatrix} a & b \\ b & -a \end{bmatrix} \begin{bmatrix} P_r \\ Q_r \end{bmatrix} + \begin{bmatrix} V_r^D - |V_s| \\ V_r^Q \end{bmatrix} \quad \text{equation (2-2)}$$

where a and b respectively are:

$$a = -\frac{R_{ser}V_r^D - X_{ser}V_r^Q}{|V_r|^2}, \; b = -\frac{R_{ser}V_r^Q + X_{ser}V_r^D}{|V_r|^2} \quad \text{equation (2-3)}$$

According to different control target values of the active and reactive power transmitted to the receiving-end bus 813, the series converter 72 can work in the following four different operating modes: automatic power flow control mode; phase control mode; voltage regulation control mode; and direct voltage injection control mode. Besides, different conditions and limitations should be satisfied when operating in any of the four operating modes. The four operating modes are described as follows:

(1) Automatic power flow control mode: The control objective of the series converter 72 in this operating mode is to set the equivalent active load $P_r'$ and equivalent reactive load $Q_r'$ transmitted to the receiving-end bus 813 as the negative values of the desired power flow injected into the first transmission line 821, respectively. Therefore, in the automatic power flow control mode, the following equation has to be satisfied:

$$\begin{bmatrix} P_r' \\ Q_r' \end{bmatrix} = -\begin{bmatrix} P_{line}^{ref} \\ Q_{line}^{ref} \end{bmatrix} \quad \text{equation (2-4)}$$

(2) Phase control mode: In this operating mode, it is required that the active power injected into the first transmission line 821 be a predetermined value $$P_{line}^{ref}.$$

Therefore, the active load $P_r'$ caused to the receiving-end bus 813 by the UPFC 7 is equal to $$-P_{line}^{ref}.$$

Besides, since $V_{ser}^D$ has little effect on the active power flow outputted to the receiving-end bus 813 by the series converter 72, $V_{ser}^D$ can be set to be equal to 0. By substituting $$P_r' = -P_{line}^{ref}$$

and $V_{ser}^D = 0$ into equation (2-2), the following equation can be obtained, where a and b are as shown in equation (2-3):

$$\begin{bmatrix} P_r' \\ Q_r' \end{bmatrix} = \begin{bmatrix} -P_{line}^{ref} \\ \left(aP_{line}^{ref} + |V_s| - V_r^D\right)/b \end{bmatrix} \quad \text{equation (2-5)}$$

(3) Voltage regulation control mode: In this operating mode, it is required that the reactive power flow injected into the first transmission line 821 be a predetermined value $$Q_{line}^{ref}.$$

Therefore, the equivalent reactive load $Q_r'$ caused to the receiving-end bus 813 by the UPFC 7 is equal to $$-Q_{line}^{ref}.$$

Besides, since $V_{ser}^Q$ has little effect on the reactive power outputted to the receiving-end bus 813 by the series converter 72, $V_{ser}^Q$ can be set to be equal to 0. By substituting $$Q_r' = -Q_{line}^{ref}$$

and $V_{ser}^Q = 0$ into equation (2-2), the following equation can be obtained, where a and b are as shown in equation (2-3):

$$\begin{bmatrix} P'_r \\ Q'_r \end{bmatrix} = \begin{bmatrix} -(aQ_{line}^{ref} - V_r^Q)/b \\ -Q_{line}^{ref} \end{bmatrix} \quad \text{equation (2-6)}$$

(4) Direct voltage injection control mode: The control objective of the series converter 72 in this mode is to set the direct-axis and quadrature-axis components of the voltage $V_{ser}$ of the series voltage source 61 to $V_{ser,ref}^D$ and $V_{ser,ref}^Q$, respectively. By substituting $V_{ser}^D = V_{ser,ref}^D$ and $V^{serQ} = V_{ser,ref}^Q$ into equation (2-2), the following equation can be obtained, where a and b are as shown in equation (2-3):

$$\begin{bmatrix} P'_r \\ Q'_r \end{bmatrix} = \frac{V_r^2}{R_{ser}^2 + X_{ser}^2} \begin{bmatrix} a|V_s| + aV_{ser,ref}^D + bV_{ser,ref}^Q + R_{ser} \\ b|V_s| + bV_{ser,ref}^D - aV_{ser,ref}^Q + X_{ser} \end{bmatrix} \quad \text{equation (2-7)}$$

The series converter 72 can control the active and reactive powers transmitted to the receiving-end bus 813 to different control values when operated in the above-mentioned four operating modes. Besides, the loads $P'_r$ and $Q'_r$ caused to the receiving-end bus 813 by the UPFC 7 can be expressed in equations (2-4) to (2-7) as a function of the direct-axis and quadrature-axis components $V_{ser}^D$, $V_{ser}^Q$ of the output voltage of the series voltage source 61. Furthermore, in this step, for the different operating modes of the series converter 72, corresponding $P'_r$ and $Q'_r$ have to be selected from equations (2-4) to (2-7) for substitution with $x^{(k)}$ to result in $P'_r(x^{(k)})$ and $Q'_r(x^{(k)})$.

The relationship between equation (2-2) and equation (2-3) is inferred from the following:

First, it can be seen from FIG. 4 that the load of the UPFC 7 on the active power $P'_r$ and the reactive power $Q'_r$ on the receiving-end bus 813 can be expressed as the relationship among $V_{ser}^D$, $V_{ser}^Q$, $I_{ser}^D$, and $I_{ser}^Q$, as follows:

$$\begin{bmatrix} P'_r \\ Q'_r \end{bmatrix} = \begin{bmatrix} V_r^D & V_r^Q \\ V_r^Q & -V_r^D \end{bmatrix} \begin{bmatrix} I_{ser}^D \\ I_{ser}^Q \end{bmatrix} \quad \text{equation (2-8)}$$

The current $I_{ser}^D$ and $I_{ser}^Q$ of the series voltage source 61 can be inferred from equation (2-8) and can be expressed using $V_r^D$, $V_r^Q$, $|V_r|$, $P'_r$, and $Q'_r$:

$$\begin{bmatrix} I_{ser}^D \\ I_{ser}^Q \end{bmatrix} = -\frac{1}{|V_r|^2} \begin{bmatrix} V_r^D & V_r^Q \\ V_r^Q & -V_r^D \end{bmatrix} \begin{bmatrix} P'_r \\ Q'_r \end{bmatrix} \quad \text{equation (2-9)}$$

In addition, the AC voltages $V_{ser}^D$ and $V_{ser}^Q$ can be expressed respectively as follows using Kirschoff's voltage law in connection with the system of FIG. 4:

$$\begin{bmatrix} V_{ser}^D \\ V_{ser}^Q \end{bmatrix} = \begin{bmatrix} R_{ser} & -X_{ser} \\ X_{ser} & R_{ser} \end{bmatrix} \begin{bmatrix} I_{ser}^D \\ I_{ser}^Q \end{bmatrix} + \begin{bmatrix} V_r^D - |V_s| \\ V_r^Q \end{bmatrix} \quad \text{equation (2-10)}$$

By substituting equation (2-9) into equation (2-10), the results of equations (2-2) and (2-3) can be obtained.

In step 205, the values of $P'_r(x^{(k)})$ and $Q'_r(x^{(k)})$ calculated in step 204 are substituted into equation (2-9) to calculate the values of the currents $I_{ser}^D(x^{(k)})$ and $I_{ser}^Q(x^{(k)})$ of the series voltage source 61.

In step 206, the equivalent active load $P'_s$ and the equivalent reactive load $Q'_s$ of the UPFC 7 on the sending-end bus 811 are expressed as a function of the currents $I_{ser}^D$ and $I_{ser}^Q$ of the series voltage source 61 and the currents $I_{sh}^D$ and $I_{sh}^Q$ of the shunt voltage source 63 based on equation (2-11). Besides, the state vector $x^{(k)}$ and $I_{ser}^D(x^{(k)})$, $I_{ser}^Q(x^{(k)})$ obtained in step 205 are substituted to obtain the equivalent active load $P'_s(x^{(k)})$ and the equivalent reactive load $Q'_s(x^{(k)})$ of the UPFC 7.

$$\begin{bmatrix} P'_s \\ Q'_s \end{bmatrix} = \begin{bmatrix} V_s & 0 \\ 0 & -V_s \end{bmatrix} \begin{bmatrix} I_{ser}^D \\ I_{ser}^Q \end{bmatrix} + \begin{bmatrix} -V_s & 0 \\ 0 & V_s \end{bmatrix} \begin{bmatrix} I_{sh}^D \\ I_{sh}^Q \end{bmatrix} \quad \text{equation (2-11)}$$

where $I_{sh}^Q$ can be obtained by calculating equation (2-12) when the shunt converter 74 is operated in the automatic reactive power control-mode.

$$I_{sh}^Q = -\frac{Q_{sh}^{ref}}{|V_s|} \quad \text{equation (2-12)}$$

In step 207, the mismatch of an active power balance equation $P'_{dc}$ is calculated according to equation (2-13).

$$P'_{dc} = k_{ser} P'_{ser} + k_{sh} P'_{sh} \quad \text{equation (2-13)}$$

where $P'_{ser}$ is the active power which the series converter 72 outputs to the AC side, and must be equal to the active power consumed by the impedance of the series transformer 71 plus the summation of the active powers injected between the sending-end and receiving-end buses 811, 813. Hence, equation (2-14) can be obtained:

$$P'_{ser} = I_{ser}^D(V_r^D - |V_s|) + I_{ser}^Q V_r^Q + (I_{ser}^{D2} + I_{ser}^{Q2}) R_{ser} \quad \text{equation (2-14)}$$

Similarly, $P'_{sh}$ is the active power which the shunt converter 74 outputs to the AC side, and must be equal to the active power consumed by the impedance of the shunt transformer 75 plus the active power which the shunt transformer 75 injects into the sending-end bus 811. Hence, equation (2-15) can be obtained:

$$P'_{sh} = I_{sh}^D |V_s| + (I_{sh}^{D2} + I_{sh}^{Q2}) R_{sh} \quad \text{equation (2-15)}$$

$k_{ser}$ and $k_{sh}$ are conversion ratios of the AC side active power to the DC side active power of the series converter 72 and the shunt converter 74, respectively. The conversion ratios can be calculated from efficiency coefficients provided by manufacturers of the converters 72, 74, and represent that, since the converters 72, 74 will consume a portion of the active power during operation, the active powers outputted from the converters 72, 74 are less than the active powers flowing into the converters 72, 74.

The conversion ratios are related to the use of the converters 72, 74 as inverters or rectifiers. For example, when the converters 72, 74 are used as rectifiers, the active power is converted from the AC side of the converters 72, 74 to the DC side, and the conversion ratio is equal to the corresponding efficiency coefficient. However, when the converters 72, 24 are used as inverters, the active power is converted from the DC side of the converters 72, 74 to the AC side, and the conversion ratio is equal to the reciprocal of the corresponding efficiency coefficient.

In step 208, the value f' of the mismatch vector of the power transmission network that includes the UPFC 7 is calculated based on equation (2-16):

$$f' = f + \Delta f_{UPFC} \qquad \text{equation (2-16)}$$

where f is the mismatch vector while neglecting the UPFC 7, and was obtained in step 202, whereas $\Delta f_{UPFC}$ is the amount of adjustment which is calculated based on equation (2-17):

$$\Delta f_{UPFC} = \begin{bmatrix} P'_s \\ Q'_s \\ P'_r \\ Q'_r \\ P'_{dc} \end{bmatrix} \qquad \text{equation (2-17)}$$

where $P_r'(x^{(k)})$, $Q_r'(x^{(k)})$, $P_s'(x^{(k)})$, $Q_s'(x^{(k)})$, and $P_{dc}'(x^{(k)})$ in equation (2-17) have been obtained in steps 204, 206, and 207, respectively.

The amount of adjustment was added in step 208 because, after the UPFC 7 is added to the power transmission network of FIG. 6, the converters 72, 74 and the transformers 71, 75 in the UPFC 7 will absorb active power, and the absorbed active power will result in equivalent loads on the sending-end and receiving-end buses 811, 813. At the same time, it is necessary to maintain active power balance at the direct current coupling capacitor 73 on the DC side during active power transfer between the shunt converter 72 and the series converter 74. Therefore, $P_{dc}'$ has to be considered when calculating the value of the mismatch vector f'. In addition, the load effect caused by the UPFC 7 on the sending-end and receiving-end buses 811, 813 will adjust the values of the active and reactive powers, which are transmitted to the sending-end and receiving-end buses 811, 813, in the mismatch vector f. Therefore, the adjustment function $\Delta f_{UPFC}$ includes the active and reactive loads $P_r'(x^{(k)})$, $Q_r'(x^{(k)})$, $P_s'(x^{(k)})$, and $Q_s'(x^{(k)})$ of the UPFC 7 on the sending-end and receiving-end buses 811, 813, and the mismatch of the active power balancing equation $P_{dc}'(x^{(k)})$.

The adjustment function $\Delta f_{UPFC}$ is added to the mismatch vector f to result in the mismatch vector f' of the power transmission network that includes the UPFC 7. Correspondingly, $P_r'(x^{(k)})$, $Q_r'(x^{(k)})$, $P_s'(x^{(k)})$, and $Q_s'(x^{(k)})$ in the adjustment function $\Delta f_{UPFC}$ are added respectively to $P_r(x^{(k)})$, $Q_r(x^{(k)})$, $P_s(x^{(k)})$, and $Q_s(x^{(k)})$ of the mismatch vector f in equation (1-5), such that an active power $P_{dc}'(x^{(k)})$ will be added to them is match vector f to result in them is match vector f'. Therefore, the mismatch vector f' correspondingly represents the power transmission network that includes the UPFC 7 of FIG. 2 so as to reflect the effect or influence on the sending-end and receiving end buses 811, 813 after installation of the UPFC 7.

In step 209, the value J' of the Jacobian matrix of the power transmission network that includes the UPFC 7 is calculated based on equation (2-18):

$$J' = J + \Delta J = J + (\partial \Delta f_{UPFC}/\partial x) \qquad \text{equation (2-18)}$$

where J is the Jacobian matrix of the power transmission network while neglecting the UPFC 7, and was obtained in step 203. J' has one more additional column $\partial P_{dc}/\partial x$ and one more additional row $\partial \Delta f_{UPFC}/\partial I_{sh}^D$ than J.

In step 210, the updated state vector $x^{(k+1)}$ is calculated based on equation (2-19):

$$x^{(k+1)} = x^{(k)} - J'^{-1}(x^{(k)}) f'(x^{(k)}) \qquad \text{equation (2-19)}$$

where $f'(x^{(k)})$ and $J'(x^{(k)})$ have been respectively obtained in steps 208 and 209.

In step 211, it is determined whether $f'(x^{(k)})$ is smaller than a tolerable error. If $f'(x^{(k)})$ is smaller than the tolerable error, this indicates that the state vector x has converged to a power flow solution, and the next step 212 can be executed. If $f'(x^{(k)})$ is larger than the tolerable error, $x^{(k+1)}$ is used to replace $x^{(k)}$, and the flow skips back to step 202. Steps 202 to 211 are repeated until $f'(x^{(k)})$ is smaller than the tolerable error. The convergence value indicates that power flows on all the buses of the power transmission network are balanced with one another, and that the voltage magnitudes and the phase angles have achieved a stable state.

In step 212, the convergence value of the state vector is substituted into equation (2-20) and equation (2-21) to calculate the values of $V_{ser}$ and $V_{sh}$, respectively:

$$V_{ser} = |V_{ser}| \angle \theta_{ser} \qquad \text{equation (2-20)}$$
$$= \sqrt{V_{ser}^{D2} + V_{ser}^{Q2}} \angle \left( \tan^{-1} \frac{V_{ser}^Q}{V_{ser}^D} + \theta_s \right)$$

$$V_{sh} = |V_{sh}| \angle \theta_{sh} \qquad \text{equation (2-21)}$$
$$= \sqrt{V_{sh}^{D2} + V_{sh}^{Q2}} \angle \left( \tan^{-1} \frac{V_{sh}^Q}{V_{sh}^D} + \theta_s \right)$$

where $V_{ser}^D$ and $V_{ser}^Q$ in equation (2-20) can be calculated from equation (2-10).

By using Kirschoff's voltage law, $V_{sh}^D$ and $V_{sh}^Q$ in equation (2-21) can be calculated from equation (2-22).

$$\begin{bmatrix} V_{sh}^D \\ V_{sh}^Q \end{bmatrix} = \begin{bmatrix} R_{sh} & -X_{sh} \\ X_{sh} & R_{sh} \end{bmatrix} \begin{bmatrix} I_{sh}^D \\ I_{sh}^Q \end{bmatrix} + \begin{bmatrix} |V_s| \\ 0 \end{bmatrix} \qquad \text{equation (2-22)}$$

In step 213, the converters of the UPFC 7 are correspondingly set using PWM techniques. As this step is the same as that described in connection with the prior art described above, a detailed description thereof is omitted herein for the sake of brevity.

After setting the converters of the UPFC 7 using PWM techniques, with the values $V_{ser}$ and $V_{sh}$ as parameters, when the series converter 72 is operated in the automatic power flow control mode, the power flow transmitted to the receiving-end bus 813 will achieve the predetermined control target values $$P_{line}^{ref}, Q_{line}^{ref}$$

with accuracy. If the series converter 72 is operated in the other three modes, the series converter 72 can likewise achieve the corresponding control objective to which each of the operating modes corresponds.

In addition, it is noted that, in the aforesaid computational flow, to match the control target at the sending-end bus 811, the shunt converter 74, aside from being operable in the automatic reactive power control mode, can also be operated in an automatic voltage control mode. The control objective of the shunt converter 74 in the automatic voltage control mode is to set the voltage magnitude $|V_s|$ at the sending-end bus 811 to a fixed value $|V_s^{ref}|$. At this time, the voltage magnitude $|V_s|$ at the sending-end bus 811 is regulated by the quadrature-axis component $I_{sh}^Q$ of the current outputted by the shunt voltage source 63. Therefore, in the aforesaid computational flow, the state vector x in step 201 includes $\theta_s$, $\theta_r$, $|V_r|$, $I_{sh}^D$, and $I_{sh}^Q$ so as to achieve the control target $|V_s^{ref}|$ by adjusting $I_{sh}^Q$. Although the state vector in the aforesaid computational flow has changed, the process and steps remain the same as those illustrated above.

In sum, in the method for calculating power flow solution of a power transmission network that includes unified power flow controllers according to this invention, the impedance values $R_{ser}$, $R_{sh}$, $X_{ser}$, and $X_{sh}$ of the transformers of the UPFC 7 are added to equations (2-14) and (2-15) to calculate the active power consumption of the transformers 71, 75. In addition, the conversion ratios $k_{ser}$ and $k_{sh}$ of the converters 72, 74 are added to equation (2-13) for considering the active power loss of the converters 72, 74, such that the effects of the converters 72, 74 and the transformers 71, 75 of the UPFC 7 on the active powers at the sending-end and receiving-end buses 811, 813 can be added to the mismatch vector of the UPFC 7 to the buses. As a result, the output voltages of the voltage sources, $V_{sh}=|V_{sh}|\angle\theta_{sh}$ and $V_{ser}=|V_{ser}|\angle\theta_{ser}$, can be obtained with accuracy to thereby enable the power flow of the receiving-end bus 813 to accurately reach the control target value. Furthermore, it was observed from simulation results that the selection of initial values for the state vector in this invention does not have a significant effect on the convergence characteristics. Moreover, the method for calculating power flow solution of a power transmission network that includes unified power flow controllers according to this invention is applicable to different control objectives, and is capable of achieving good convergence characteristics under the different control objectives.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for calculating power flow solution of a power transmission network that includes unified power flow controllers, said method being adapted to analyze a power transmission network that includes at least one unified power flow controller, at least one power generating device, at least one load device, a first transmission line, a sending-end bus, and a receiving-end bus, the unified power flow controller being embedded between the sending-end and receiving-end buses, the first transmission line being connected electrically to the receiving-end bus, the unified power flow controller including a series transformer, a series converter, a direct current coupling capacitor, a shunt converter, and a shunt transformer, the shunt transformer being connected electrically to the sending-end bus, the series transformer being connected electrically to the sending-end bus and the receiving-end bus, the direct current coupling capacitor being connected electrically to the shunt converter and the series converter, the series converter being connected electrically to the shunt converter and the series transformer, the shunt converter being connected electrically to the shunt transformer, the unified power flow controller being expressible using an equivalent model, the equivalent model including a series voltage source, a series impedance, a shunt voltage source, and a shunt impedance, the series voltage source having one end connected electrically to the receiving-end bus, the series impedance being connected electrically to the other end of the series voltage source and the sending-end bus, the shunt impedance being connected electrically to the sending-end bus and the shunt voltage source, said method comprising the steps of:

(A) giving an initial vector value $x^{(k)}$ to a state vector x, elements in the state vector x including a direct-axis component $I_{sh}^D$ of an output current of the shunt voltage source of the equivalent model, and voltage magnitude and phase angle at each of said buses of the power transmission network;

(B) performing orthogonal decomposition of a voltage $V_r$ at the receiving-end bus such that the voltage $V_r$ has a direct-axis component $V_r^D$ and a quadrature-axis component $V_r^Q$;

(C) according to the value of the state vector x, calculating the value of a mismatch vector f of the power transmission network while neglecting the unified power flow controller;

(D) according to the value of the state vector x, calculating the value of a Jacobian matrix J of the power transmission network while neglecting the unified power flow controller;

(E) according to the value of the state vector x, calculating an equivalent active load demand $P_r'(x^{(k)})$ and an equivalent reactive load demand $Q_r'(x^{(k)})$ of the unified power flow controller on the receiving-end bus;

(F) according to the values $P_r'(x^{(k)})$, $Q_r'(x^{(k)})$ calculated in step (E), calculating current values $I_{ser}^D(x^{(k)})$, $I_{ser}^Q(x^{(k)})$ of the series voltage source in the equivalent model;

(G) calculating an equivalent active load demand $P_s'(x^{(k)})$ and an equivalent reactive load demand $Q_s'(x^{(k)})$ of the unified power flow controller on the sending-end bus;

(H) according to active power losses of the transformers and the converters in the unified power flow controller, calculating the mismatch of an active power balance equation $P_{dc}'(x^{(k)})$;

(I) calculating the value $f'(x^{(k)})$ of a mismatch vector of the power transmission network that includes the unified power flow controller;

(J) calculating the value of a Jacobian matrix $J'(x^{(k)})$ of the power transmission network that includes the unified power flow controller;

(K) according to the following equation, updating the state vector $x^{(k+1)}$:

$$x^{(k+1)}=x^{(k)}-J'^{-1}(x^{(k)})f'(x^{(k)})$$

where $f'(x^{(k)})$ and $J'(x^{(k)})$ were respectively obtained in steps (I) and (J);

(L) determining whether $f'(x^{(k)})$ is smaller than a tolerable error and proceeding to step (M) if $f'(x^{(k)})$ is smaller the tolerable error, and otherwise using $x^{(k+1)}$ to update the state vector x, and skipping back to step (B) to repeat steps (B) to (L);

(M) calculating voltages $V_{ser}$, $V_{sh}$ of the series voltage source and the shunt voltage source according to the convergence value of the state vector x; and (N) setting the converters of the unified power flow controller according to the voltages $V_{ser}$, $V_{sh}$ obtained in step (M).

2. The method for calculating power flow solution of a power transmission network that includes unified power flow controllers as claimed in claim 1, wherein, in step (B), orthogonal decomposition of the voltage $V_r$ at the receiving-end bus is performed according to the following equation such that the voltage $V_r$ has the direct-axis component $V_r^D$ and the quadrature-axis component $V_r^Q$:

$$V_r = V_r^D + jV_r^Q = |V_r|e^{j(\theta_r - \theta_s)}$$

where a phase angle $\theta_s$ of a voltage $V_s$ at the sending-end bus is used as a reference angle in the equation.

3. The method for calculating power flow solution of a power transmission network that includes unified power flow controllers as claimed in claim 1, wherein the shunt converter is operated in an automatic reactive power control mode, in which a control objective is to maintain reactive power injected into the sending-end bus at a fixed value $Q_{sh}^{ref}$.

4. The method for calculating power flow solution of a power transmission network that includes a unified power flow controller as claimed in claim 1, wherein the shunt converter is operated in an automatic voltage control mode, the elements in the state vector x further including a quadrature-axis component $I_{sh}^Q$ of the output current of the shunt voltage source, a control objective of the shunt converter when operated in the automatic voltage control mode being to set a voltage magnitude $|V_s|$ at the sending-end bus to a fixed value $|V_s^{ref}|$.

5. The method for calculating power flow solution of a power transmission network that includes unified power flow controllers as claimed in claim 1, wherein, in step (C), the mismatch vector f(x) is represented by the following equation:

$$f(x) = \begin{bmatrix} P_i(x) - (P_{Gi} - P_{Li}) \\ Q_i(x) - (Q_{Gi} - Q_{Li}) \end{bmatrix} i = 1, 2, \ldots, m$$

where m is the number of the buses in the power transmission network; $P_{Li}$ and $Q_{Li}$ are respectively active power and reactive power consumed by the load device connected to the bus i; $P_{Gi}$ and $Q_{Gi}$ are respectively active power and reactive power generated by the power generating device connected to the bus i; and $P_i$ and $Q_i$ are respectively total active power and total reactive power flowing from the bus i to the transmission lines, and are represented by the following equations:

$$P_i = \sum_{k=1}^{n} |V_i||V_k|[G_{ik}\cos(\theta_i - \theta_k) + B_{ik}\sin(\theta_i - \theta_k)]$$

$$Q_i = \sum_{k=1}^{n} |V_i||V_k|[G_{ik}\sin(\theta_i - \theta_k) + B_{ik}\cos(\theta_i - \theta_k)]$$

where $G_{ik} + jB_{ik}$ are admittances of the transmission lines and are calculated from the reciprocal of impedances of the transmission lines; n is the number of the transmission lines connected to the bus i; $|V_i|$ and $|V_k|$ are respectively voltage magnitudes at the bus i and the bus k; and $\theta_i$ and $\theta_k$ are respectively phase angles at the bus i and the bus k.

6. The method for calculating power flow solution of a power transmission network that includes unified power flow controllers as claimed in claim 1, wherein, in step (D), the Jacobian matrix J is obtained by calculating first-order partial derivatives of the mismatch vector f with respect to the state vector x.

7. The method for calculating power flow solution of a power transmission network that includes unified power flow controllers as claimed in claim 1, wherein, in step (E), the equivalent active load $P_r'$ and the equivalent reactive load $Q_r'$ which are absorbed from the receiving-end bus are set to $$-P_{line}^{ref}$$

and $$-Q_{line}^{ref},$$

respectively.

8. The method for calculating power flow solution of a power transmission network that includes unified power flow controllers as claimed in claim 1, wherein, in step (E), the active power $P_r'$ absorbed from the receiving-end bus is set to a predetermined value $$-P_{line}^{ref},$$

the direct-axis component $V_{ser}^D$ of the voltage of the series voltage source is set to 0, and the active load $P_r'$ and the reactive load $Q_r'$ of the receiving-end bus are represented by the following equation:

$$\begin{bmatrix} P_r' \\ Q_r' \end{bmatrix} = \begin{bmatrix} -P_{line}^{ref} \\ (aP_{line}^{ref} + |V_s| - V_r^D)/b \end{bmatrix}$$

where a and b are respectively represented by the following equations, and $|V_s|$ is the voltage magnitude at the sending-end bus:

$$a = -\frac{R_{ser}V_r^D - X_{ser}V_r^Q}{|V_r|^2}, \quad b = -\frac{R_{ser}V_r^Q + X_{ser}V_r^D}{|V_r|^2}$$

where $R_{ser}$ and $X_{ser}$ are respectively the resistance and the reactance of the series transformer.

9. The method for calculating power flow solution of a power transmission network that includes unified power flow controllers as claimed in claim 1, wherein, in step (E), reactive power flow injected into the receiving-end bus is set to a predetermined value $$Q_{line}^{ref},$$

the quadrature-axis component $V_{ser}^Q$ of the voltage of the series voltage source is set to 0, and the active load $P_r'$ and the reactive load $Q_r'$ of the receiving-end bus are represented by the following equation:

$$\begin{bmatrix} P'_r \\ Q'_r \end{bmatrix} = \begin{bmatrix} -(aQ_{line}^{ref} - V_r^Q)/b \\ -Q_{line}^{ref} \end{bmatrix}$$

where a and b are respectively represented by the following equations:

$$a = -\frac{R_{ser}V_r^D - X_{ser}V_r^Q}{|V_r|^2}, \quad b = -\frac{R_{ser}V_r^Q + X_{ser}V_r^D}{|V_r|^2}$$

where $R_{ser}$ and $X_{ser}$ are respectively the resistance and the reactance of the series transformer.

10. The method for calculating power flow solution of a power transmission network that includes unified power flow controllers as claimed in claim 1, wherein, in step (E), the direct-axis and quadrature-axis components of the voltage $V_{ser}$ of the series voltage source are set to be $V_{ser,ref}^D$ and $V_{ser,ref}^Q$, respectively, whereas the active load $P'_r$ and the reactive load $Q'_r$ on the receiving-end bus are represented by the following equation:

$$\begin{bmatrix} P'_r \\ Q'_r \end{bmatrix} = \frac{V^2}{R_{ser}^2 + X_{ser}^2} \begin{bmatrix} a|V_s| + aV_{ser,ref}^D + bV_{ser,ref}^Q + R_{ser} \\ b|V_s| + bV_{ser,ref}^D - aV_{ser,ref}^Q + X_{ser} \end{bmatrix}$$

where a and b are represented by the following equations, $|V_s|$ is the voltage magnitude at the sending-end bus, and $R_{ser}$ and $X_{ser}$ are respectively the resistance and the reactance of the series transformer:

$$a = -\frac{R_{ser}V_r^D - X_{ser}V_r^Q}{|V_r|^2}, \quad b = -\frac{R_{ser}V_r^Q + X_{ser}V_r^D}{|V_r|^2}.$$

11. The method for calculating power flow solution of a power transmission network that includes unified power flow controllers as claimed in claim 1, wherein, in step (F), the values of $P'_r$ and $Q'_r$ calculated in step (E) are substituted into the following equation to calculate the values of the direct-axis component $I_{ser}^D$ and the quadrature-axis component $I_{ser}^Q$ of the output current of the series voltage source:

$$\begin{bmatrix} I_{ser}^D \\ I_{ser}^Q \end{bmatrix} = -\frac{1}{|V_r|^2} \begin{bmatrix} V_r^D & V_r^Q \\ V_r^Q & -V_r^D \end{bmatrix} \begin{bmatrix} P'_r \\ Q'_r \end{bmatrix}.$$

12. The method for calculating power flow solution of a power transmission network that includes unified power flow controllers as claimed in claim 1, wherein, in step (G), the equivalent active load $P'_s$ and the equivalent reactive load $Q'_s$ of the unified power flow controller on the sending-end bus are expressed as a function of the direct-axis and quadrature-axis components $I_{ser}^D$ and $I_{ser}^Q$ of the current of the series voltage source, and the state vector x and $I_{ser}^D(x^{(k)})$ and $I_{ser}^Q(x^{(k)})$ obtained in step (F) are substituted into the following equation to calculate $P'_s(x^{(k)})$ and $Q'_s(x^{(k)})$:

$$\begin{bmatrix} P'_s \\ Q'_s \end{bmatrix} = \begin{bmatrix} V_s & 0 \\ 0 & -V_s \end{bmatrix} \begin{bmatrix} I_{ser}^D \\ I_{ser}^Q \end{bmatrix} + \begin{bmatrix} -V_s & 0 \\ 0 & V_s \end{bmatrix} \begin{bmatrix} I_{sh}^D \\ I_{sh}^Q \end{bmatrix}$$

where $V_s$ is the voltage at the sending-end bus, and $I_{sh}^Q$ is obtained by using the following equation when the shunt converter is operated in an automatic reactive power control mode:

$$I_{sh}^Q = -\frac{Q_{sh}^{ref}}{|V_s|}$$

where $Q_{sh}^{ref}$ is the reactive power set to be injected into the sending-end bus.

13. The method for calculating power flow solution of a power transmission network that includes unified power flow controllers as claimed in claim 1, wherein, in step (H), the mismatch of the active power balance equation $P'_{dc}$ is calculated from the following equation:

$$P'_{dc} = k_{ser}P'_{ser} + k_{sh}P'_{sh}$$

where $k_{ser}$ and $k_{sh}$ are respectively conversion ratios of AC side active power to DC side active power of the series converter and the shunt converter, $P'_{ser}$ is the active power injected from the series converter, and $P'_{sh}$ is the active power injected from the shunt converter, $P'_{ser}$ and $P'_{sh}$ being represented by the following equations:

$$P'_{ser} = I_{ser}^D(V_r^D - |V_s|) + I_{ser}^Q V_r^Q + (I_{ser}^{D^2} + I_{ser}^{Q^2})R_{ser}$$

$$P'_{sh} = I_{sh}^D|V_s| + (I_{sh}^{D^2} + I_{sh}^{Q^2})R_{sh}$$

where $|V_s|$ is the voltage magnitude at the sending-end bus, $R_{ser}$ and $R_{sh}$ are respectively the resistances of the series transformer and the shunt transformer, and $I_{sh}^Q$ is the quadrature-axis component of the output current of the shunt voltage source.

14. The method for calculating power flow solution of a power transmission network that includes unified power flow controllers as claimed in claim 1, wherein, in step (I), the mismatch vector f' of the power transmission network that includes the unified power flow controller is calculated from the following equation:

$$f' = f + \Delta f_{UPFC}$$

where the mismatch vector f of the power transmission network without the unified power flow controller has been obtained in step (C), and $\Delta f_{UPFC}$ is an amount of adjustment that is calculated according to the following equation:

$$\Delta f_{UPFC} = \begin{bmatrix} P'_s \\ Q'_s \\ P'_r \\ Q'_r \\ P'_{dc} \end{bmatrix}$$

where $P'_r$ and $Q'_r$ have been obtained in step (E), $P'_s$ and $Q'_s$ have been obtained in step (G), and $P'_{dc}$ has been obtained in step (H).

15. The method for calculating power flow solution of a power transmission network that includes unified power flow controllers as claimed in claim 1, wherein, in step (J), the Jacobian matrix J' of the power transmission network that includes the unified power flow controllers is obtained from the following equation:

$$J' = J + \Delta J = J + (\partial \Delta f_{UPFC}/\partial x)$$

where J has been obtained in step (D), J' has one additional column $\partial P_{dc}/\partial x$ and one additional row $\partial \Delta f_{UPFC}/\partial I_{sh}^D$ more than J, and $\Delta f_{UPFC}$ is calculated from the following equation:

$$\Delta f_{UPFC} = \begin{bmatrix} P'_s \\ Q'_s \\ P'_r \\ Q'_r \\ P'_{dc} \end{bmatrix}$$

where $P_r'$ and $Q_r'$ have been obtained in step (E), $P_s'$ and $Q_s'$ have been obtained in step (G), and $P_{dc}'$ has been obtained in step (H).

16. The method for calculating power flow solution of a power transmission network that includes unified power flow controllers as claimed in claim 1, wherein, in step (M), the voltages $V_{ser}$ and $V_{sh}$ of the series voltage source and the shunt voltage source are calculated respectively using the following equations:

$$V_{ser} = |V_{ser}| \angle \theta_{ser}$$
$$= \sqrt{V_{ser}^{D2} + V_{ser}^{Q2}} \angle \left( \tan^{-1} \frac{V_{ser}^Q}{V_{ser}^D} + \theta_s \right)$$

$$V_{sh} = |V_{sh}| \angle \theta_{sh}$$
$$= \sqrt{V_{sh}^{D2} + V_{sh}^{Q2}} \angle \left( \tan^{-1} \frac{V_{sh}^Q}{V_{sh}^D} + \theta_s \right)$$

where the direct-axis and quadrature-axis components $V_{ser}^D$ and $V_{ser}^Q$ of the voltage of the series voltage source, and the direct-axis and quadrature-axis components $V_{sh}^D$ and $V_{sh}^Q$ of the voltage of the shunt voltage source are calculated respectively using the following equations:

$$\begin{bmatrix} V_{ser}^D \\ V_{ser}^Q \end{bmatrix} = \begin{bmatrix} R_{ser} & -X_{ser} \\ X_{ser} & R_{ser} \end{bmatrix} \begin{bmatrix} I_{ser}^D \\ I_{ser}^Q \end{bmatrix} + \begin{bmatrix} V_r^D - |V_s| \\ V_r^Q \end{bmatrix}$$

$$\begin{bmatrix} V_{sh}^D \\ V_{sh}^Q \end{bmatrix} = \begin{bmatrix} R_{sh} & -X_{sh} \\ X_{sh} & R_{sh} \end{bmatrix} \begin{bmatrix} I_{sh}^D \\ I_{sh}^Q \end{bmatrix} + \begin{bmatrix} |V_s| \\ 0 \end{bmatrix}$$

where $R_{sh}$ and $X_{sh}$ are the resistance and the reactance of the shunt transformer, respectively; $R_{ser}$ and $X_{ser}$ are the resistance and the reactance of the series transformer, respectively; $|V_s|$ is the voltage magnitude at the sending-end bus; and $I_{sh}^Q$ is the quadrature-axis component of the output current of the shunt voltage source.

17. The method for calculating power flow solution of a power transmission network that includes unified power flow controllers as claimed in claim 1, wherein the series converter and the shunt converter are set in step (N) using pulse width modulation techniques.

* * * * *